(12) United States Patent
Schiavon et al.

(10) Patent No.: US 9,433,881 B2
(45) Date of Patent: *Sep. 6, 2016

(54) LIQUID FILTER ASSEMBLY; AND, METHODS

(75) Inventors: Angelo Schiavon, Possio Rusco (IT); Mauro Cantoni, Mantova (IT); Andrey Zanettin, Ostiglia (IT); Claudio Formica, Pomponesco (IT)

(73) Assignee: Donaldson Company, Inc., Minneapolis, MN (US)

( * ) Notice: Subject to any disclaimer, the term of this patent is extended or adjusted under 35 U.S.C. 154(b) by 923 days.

This patent is subject to a terminal disclaimer.

(21) Appl. No.: 13/400,226

(22) Filed: Feb. 20, 2012

(65) Prior Publication Data

US 2012/0145625 A1    Jun. 14, 2012

Related U.S. Application Data

(63) Continuation of application No. 10/583,901, filed as application No. PCT/US2004/043227 on Dec. 21, 2004, now Pat. No. 8,119,002.

(60) Provisional application No. 60/532,761, filed on Dec. 22, 2003.

(51) Int. Cl.
*B01D 29/21*    (2006.01)
*B01D 35/157*    (2006.01)
(Continued)

(52) U.S. Cl.
CPC .......... *B01D 29/21* (2013.01); *B01D 35/0276* (2013.01); *B01D 35/1573* (2013.01); *B01D 35/1576* (2013.01); *B01D 2201/295* (2013.01); *B01D 2201/296* (2013.01); *B01D 2201/302* (2013.01); *B01D 2201/34* (2013.01); *B01D 2201/40* (2013.01)

(58) Field of Classification Search
None
See application file for complete search history.

(56) References Cited

U.S. PATENT DOCUMENTS

| 3,344,923 A | | 10/1967 | Silverwater et al. |
| 4,133,763 A | * | 1/1979 | Cooper .......................... 210/232 |
| 4,272,368 A | * | 6/1981 | Foord et al. .................... 210/90 |

(Continued)

FOREIGN PATENT DOCUMENTS

| AU | 503 758 B2 | 9/1979 |
| DE | 101 13 179 A1 | 9/2002 |

(Continued)

OTHER PUBLICATIONS

Pending Claims Corresponding to U.S. Appl. No. 12/310,468.

*Primary Examiner* — Krishnan S Menon
(74) *Attorney, Agent, or Firm* — Merchant & Gould, P.C.

(57) ABSTRACT

A liquid filter assembly is provided. The assembly includes a liquid filter cartridge and a housing. The liquid filter cartridge, includes, among other things, first and second, opposite, end caps each having a central aperture therethrough. A seal arrangement including a radially directed seal is mounted on a seal support of the first end cap that projects away from the second end cap. The cartridge includes a seal mount configured to define a seal plane non-orthogonal to a central axis of the cartridge. The housing includes a filter head and a housing sidewall. The filter head includes a filter head having a body, a top cover and a bottom aperture opposite the top cover. The housing extends through the bottom aperture. The cartridge as described is installed in the housing, with an end cap radially sealed against a tube in a bottom of the housing.

16 Claims, 30 Drawing Sheets

(51) Int. Cl.
    *B01D 35/147*    (2006.01)
    *B01D 35/027*    (2006.01)

(56)    References Cited

U.S. PATENT DOCUMENTS

| | | |
|---|---|---|
| 5,334,309 A | 8/1994 | Huggett et al. |
| 5,772,868 A | 6/1998 | Reinhardt |
| 6,217,755 B1 | 4/2001 | Stifelman et al. |
| 6,605,210 B2 | 8/2003 | Reinhardt et al. |
| 6,685,829 B1 | 2/2004 | Baumann et al. |
| 6,733,666 B1 | 5/2004 | Wilkendorf et al. |
| 6,936,084 B2 | 8/2005 | Schlensker et al. |
| 7,494,017 B2 | 2/2009 | Miller et al. |
| 8,119,002 B2 * | 2/2012 | Schiavon et al. ......... 210/323.2 |
| 8,177,976 B2 * | 5/2012 | Formica ..................... 210/323.2 |
| 8,632,676 B2 * | 1/2014 | Formica ..................... 210/130 |
| 2005/0252848 A1 | 11/2005 | Miller |

FOREIGN PATENT DOCUMENTS

| | | |
|---|---|---|
| EP | 0 844 012 A | 5/1998 |
| FR | 2 796 567 A | 1/2001 |
| GB | 1 604 832 | 12/1981 |
| JP | 11-247640 | 9/1999 |
| WO | 02/38247 A1 | 5/2002 |
| WO | WO 2005/061073 A1 | 7/2005 |
| WO | WO 2005/115581 A1 | 12/2005 |

* cited by examiner

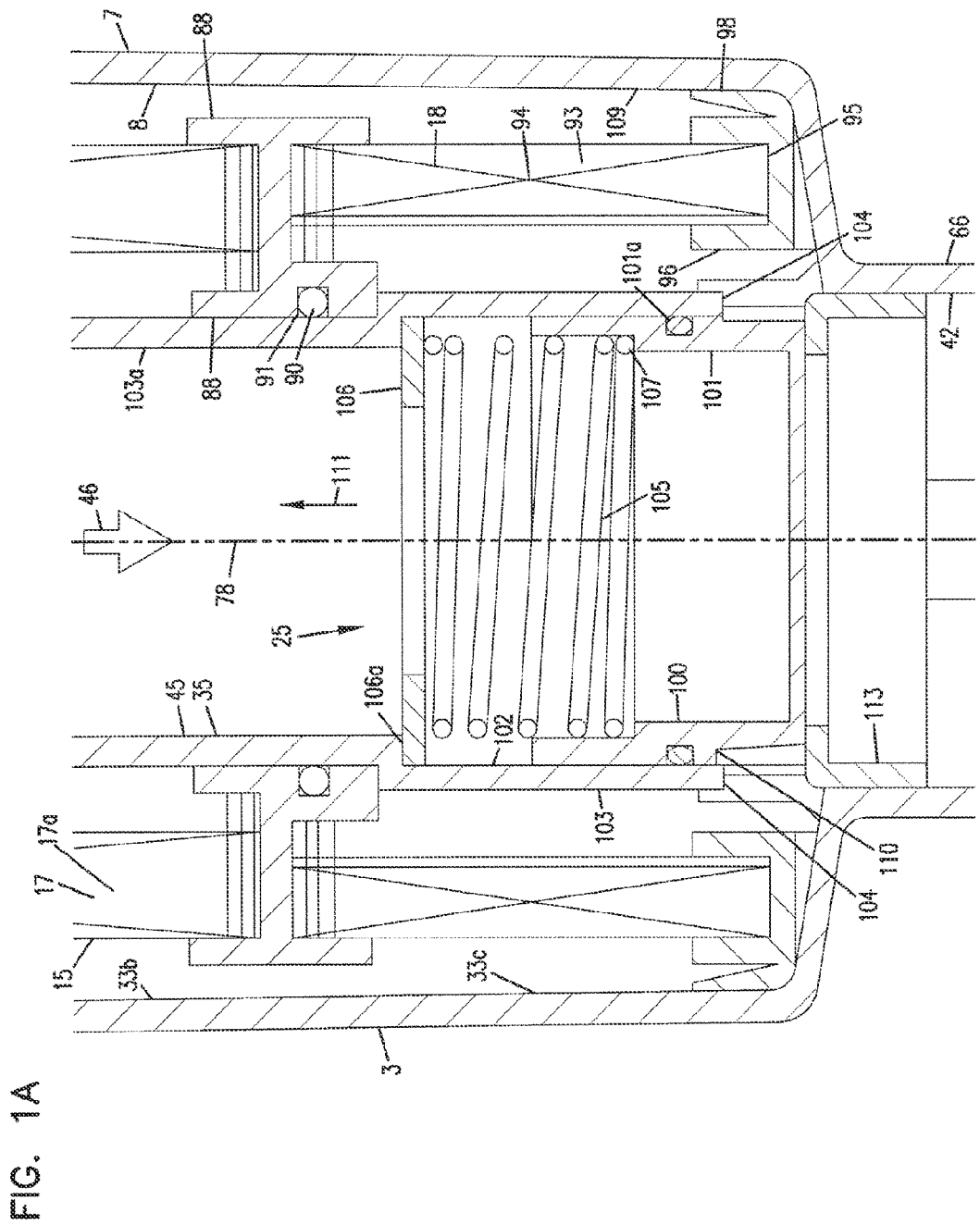

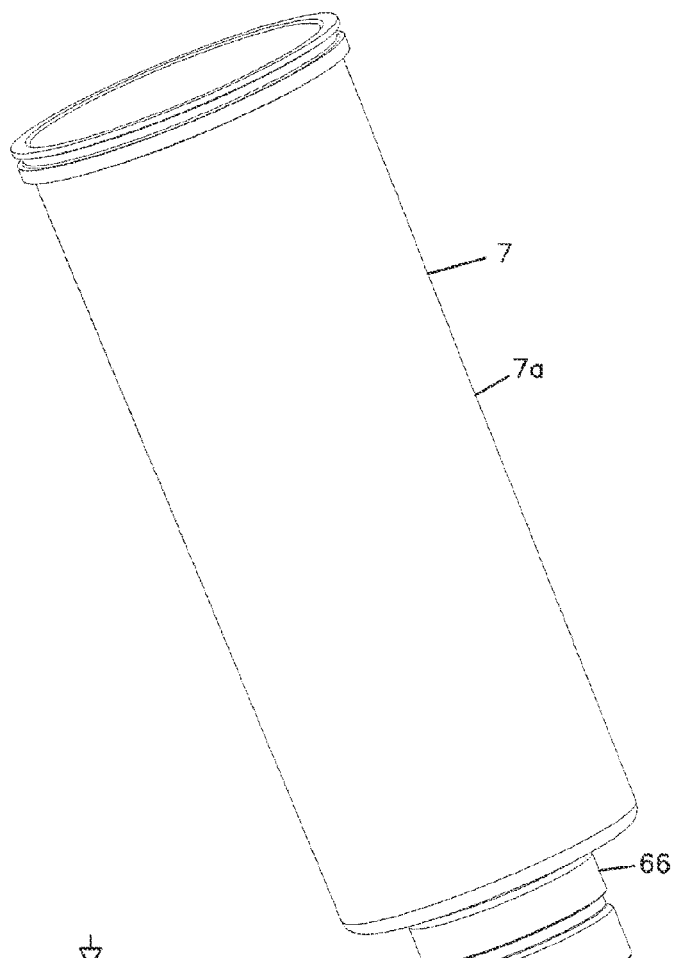
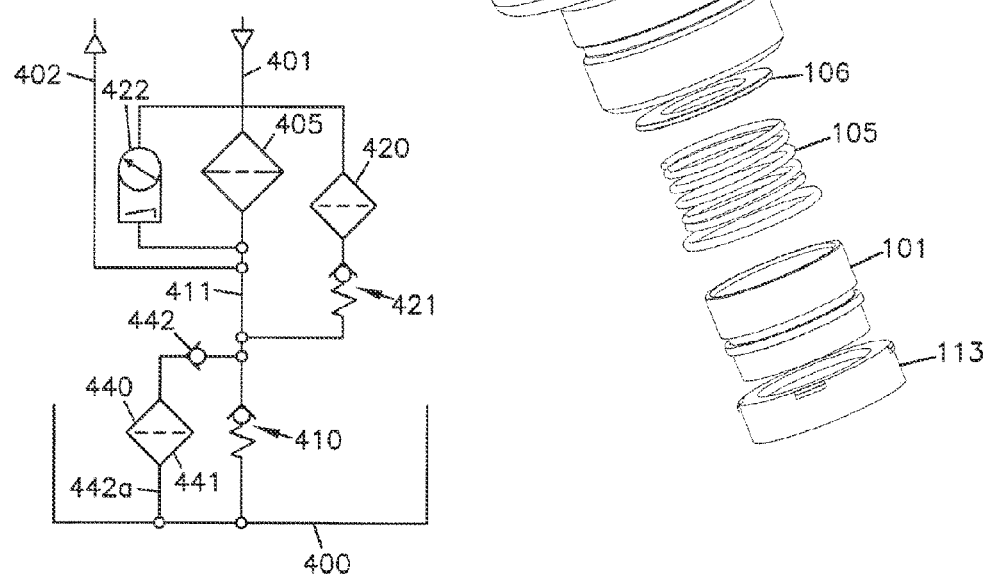

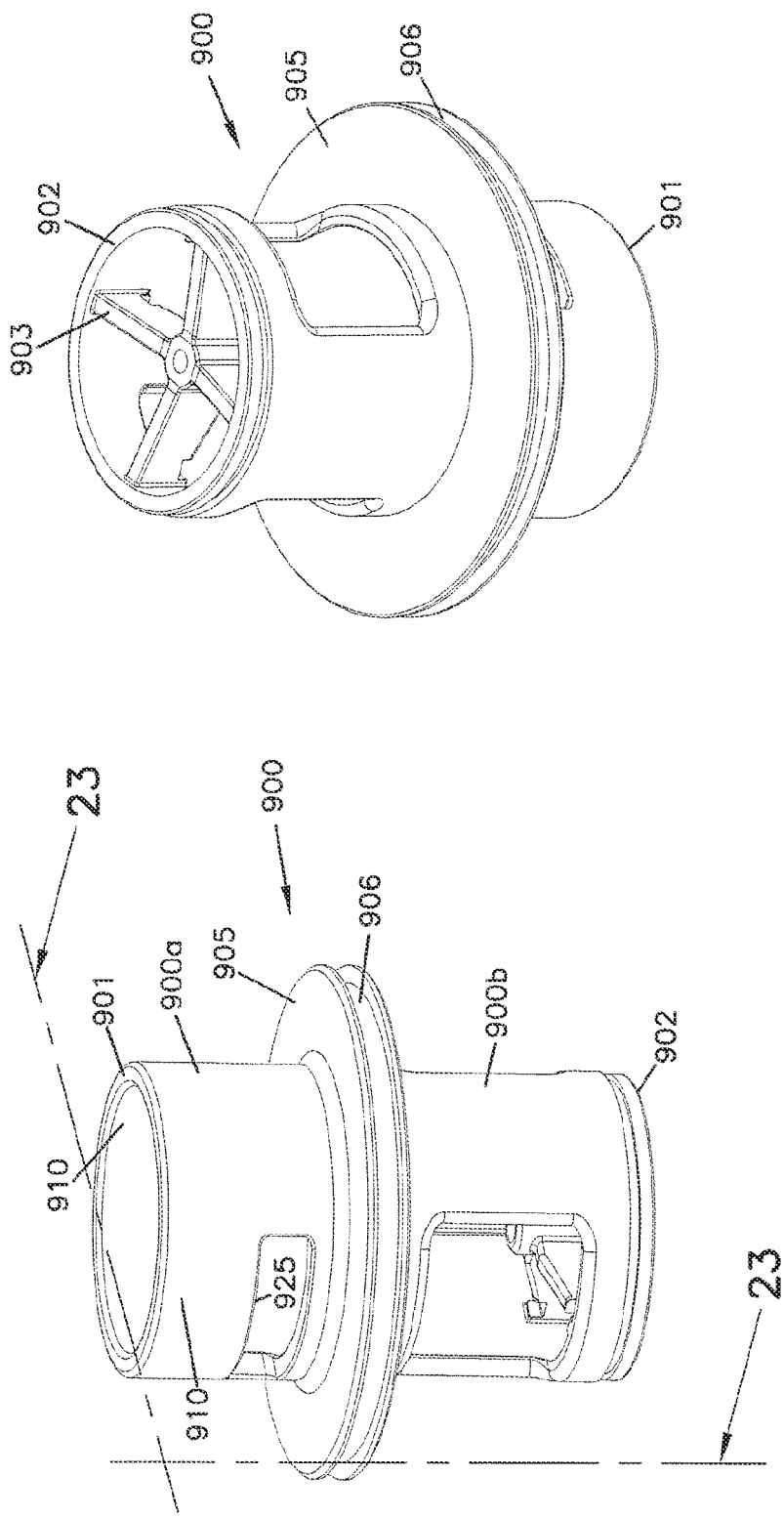

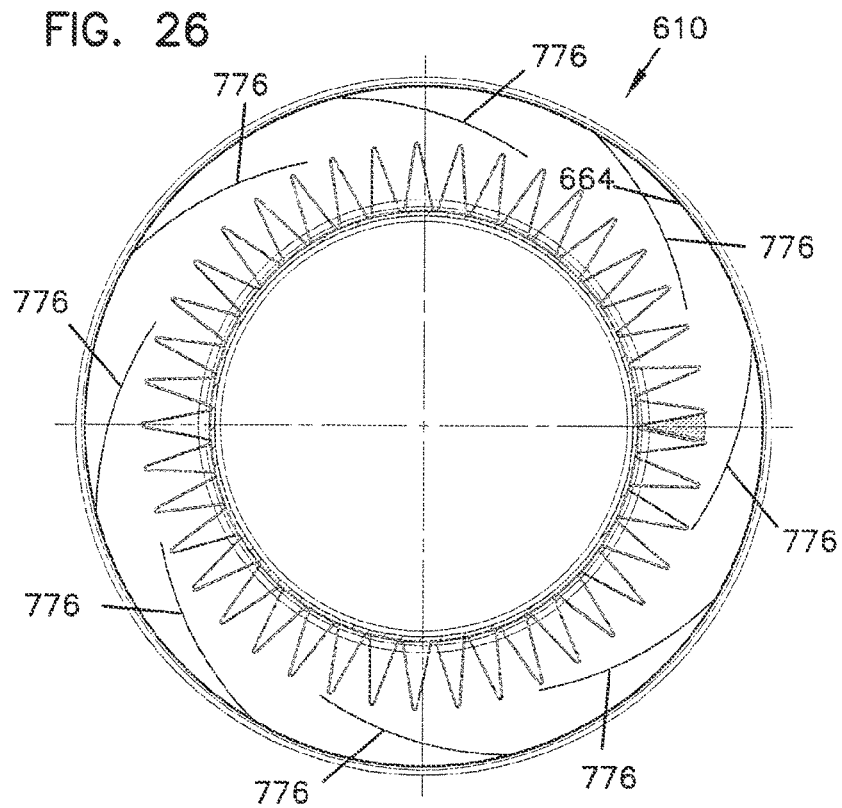

LIQUID FILTER ASSEMBLY; AND, METHODS

CROSS-REFERENCE TO RELATED APPLICATION

The present application is a continuing application of U.S. Ser. No. 10/583,901, a US National Stage application based on PCT/US2004/043227, filed Dec. 21, 2004; and, includes the content of, with edits, U.S. Provisional Application 60/532,761, filed Dec. 22, 2003. A claim to priority to each of PCT/US2004/043227; U.S. Ser. No. 10/583,901; and, U.S. Provisional 60/532,761 is made, to the extent appropriate. The complete disclosures of U.S. Ser. No. 10/583,901 and U.S. Provisional Application 60/532,761 are incorporated herein by reference.

FIELD OF THE INVENTION

The invention relates generally to liquid filters and methods. Example embodiments described, are in-tank filters, for use, for example, in a hydraulic system.

BACKGROUND OF THE INVENTION

Liquid filters are employed in a variety of applications, including, for example, hydraulic systems, fuel systems and engine lubrication systems.

In general, liquid filters which accommodate downstream components, are of concern. Particularly, it is of concern to prevent cavitation of pumps and other equipment downstream from liquid filters. Conditions such as cold starts, flow surges or occluded elements can result in damaged downstream components. Improvements are desirable.

SUMMARY OF THE INVENTION

Liquid filter assemblies are provided. The liquid filter assemblies each, include a housing and a suction filter assembly. The housing defines an interior and includes a liquid flow inlet arrangement, a liquid flow outlet arrangement, and a tank reservoir liquid flow inlet/outlet. The suction filter assembly is secured to the housing and is positioned in liquid flow communication with the tank reservoir liquid flow inlet/outlet. The suction filter assembly preferably includes an extension of suction filter media defining a central volume; and, a first, non-helical spring, directionally biased valve arrangement positioned in operative association with the suction filter media. In one example embodiment, the non-helical spring, directionally biased valve arrangement is located within the central volume defined by the suction filter media. In another example embodiment, it surrounds the suction filter media.

The first, non-helical spring, directionally biased valve arrangement is generally positioned and configured to readily permit liquid flow from a tank reservoir into the housing interior. The first, non-helical spring, directionally biased valve arrangement is also configured to resist liquid flow from the housing interior through the first, non-helical spring, directionally biased valve arrangement.

In a typical embodiment, the first, non-helical spring, directionally biased valve arrangement comprises a valve sheet having at least one cut valve therein. A typical valve sheet would comprise a valve ring-shaped member having at least one and typically a plurality of cut valves, for example flap valves, therein. Typical flap valves would be u-shaped flap valves, for example curved u-shape flap valves or boxed u-shape flap valves. Typically, the valve sheet is positioned adjacent a support that has at least one flow aperture therein.

A typical embodiment preferably further includes a flow/pressure regulation valve or valve assembly. For certain applications the flow/pressure regulation valve is positioned at a location surrounded by the suction filter media and in a position configured to regulate and selectively release flow from the housing interior to a reservoir, as a result of liquid flow passage through the reservoir liquid flow inlet/outlet. In another embodiment, a valve closure member of the flow/pressure regulation valve is positioned at a location at an end of the assembly, not specifically surrounded by the suction filter media.

In certain of the embodiments shown the flow/pressure regulation valve assembly comprises a slidable valve member, a biasing member such as a spring, and a valve seat having an aperture therein. Several variations of this are depicted.

Preferred configurations for components of, or useable in, the assemblies are provided. For example, preferred suction filter assemblies are provided. Also, preferred serviceable filter cartridge arrangements, useable in the liquid filter assemblies are provided.

The preferred filter cartridge includes: a primary filter cartridge section and a bypass filter cartridge section secured to one another; and, a first end cap. In the preferred embodiments, the primary filter cartridge section and bypass filter cartridge section are on opposite sides of the first end cap. Also positioned at the first end cap, is a seal arrangement for providing a seal with a central tube, for example a stand pipe or other structure, in the assembly with which the filter cartridge is used.

A second end cap for the filter cartridge, positioned in an opposite end of the primary filter cartridge section from the first end cap, includes a seal mount thereon. In one embodiment, the seal mount defines a seal plane extending at a non-orthogonal angle to a central axis of the primary filter cartridge section. When this non-orthogonal mount is used, preferably the seal plane defines an acute angle with the central axis within the range of 30-60°, inclusive; the term "inclusive" in this context meaning that the end points are included in the range. In another embodiment, the seal mount on the second end cap is positioned in a plane orthogonal to a central axis of the primary filter cartridge section. In this latter arrangement, preferably the second end cap includes an axially projecting tube, and the seal is mounted on an outside of this tube.

The preferred filter cartridge includes a third end cap, positioned at an opposite end of the bypass filter section from the first end cap. The third end cap can include an optional outwardly projecting contaminant collection arrangement thereon. An optional variation with a seal member is also shown.

Methods of assembly and use are also provided.

BRIEF DESCRIPTION OF THE DRAWINGS

FIG. 1A is an enlarged fragmentary view of a portion of FIG. 1.

FIG. 1D is an exploded perspective view of the assembly depicted in 1C.

FIG. 2 is a schematic diagram illustrating one example of operation of a liquid filter arrangement, according to the present disclosure.

FIG. 21 is a top perspective view of a component useable in the assembly of FIG. 10.

FIG. 22 is a bottom perspective view of the component depicted in FIG. 21.

FIG. 26 is a schematic, cross-sectional view taken along line 26-26, FIG. 24.

DETAILED DESCRIPTION

I. A First Example Embodiment; FIGS. 1-9

Figure 1:
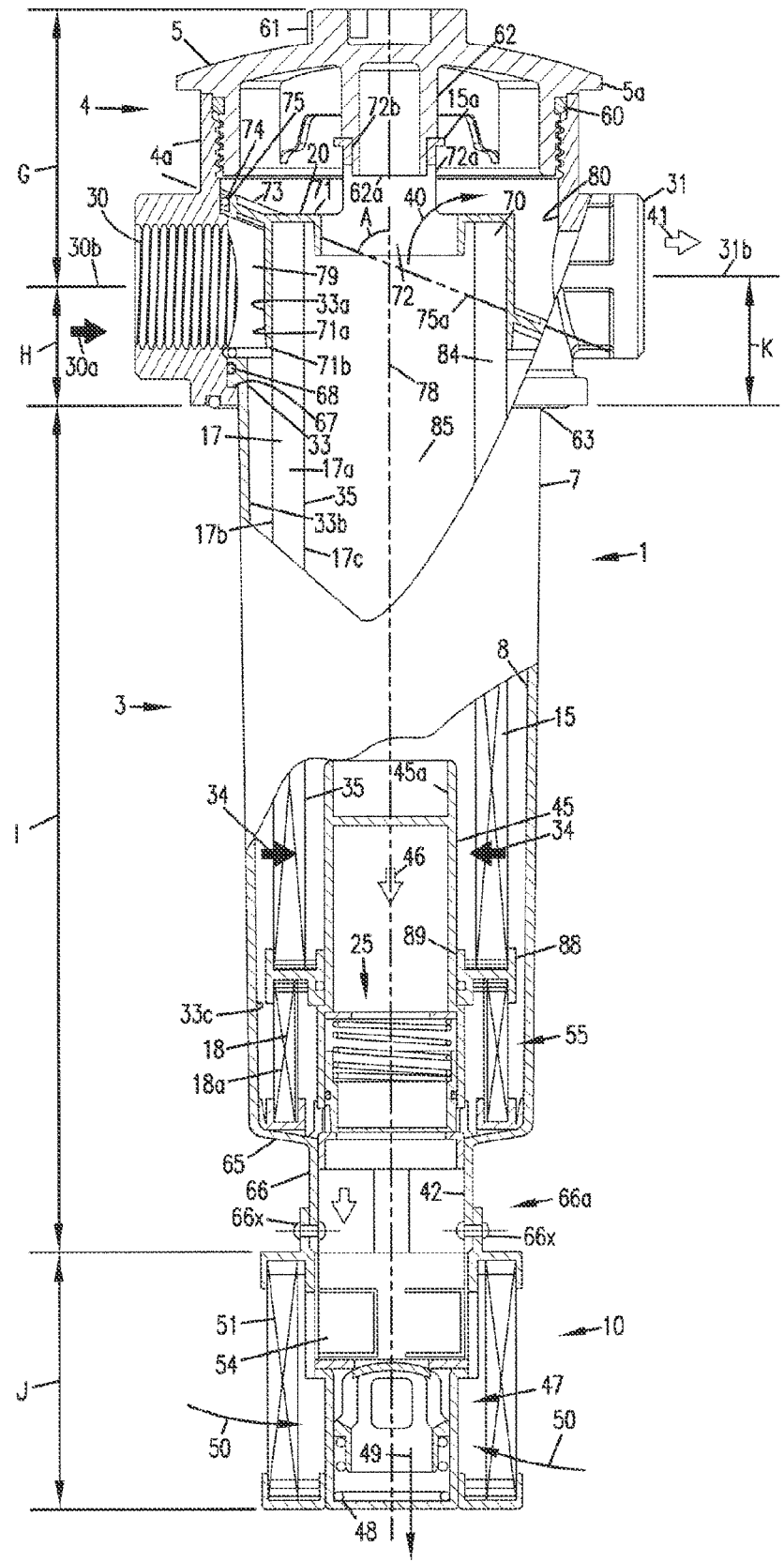
FIG. 1 is a schematic, partially cross-sectional, diagram depicting a first embodiment of a fluid filter arrangement, according to the present disclosure.

The reference numeral 1, FIG. 1, generally indicates a liquid filter arrangement or assembly according to one embodiment of the present disclosure. In FIG. 1, the assembly 1 is depicted in an ordinary orientation for use. Herein the terms "top," "bottom," "above," and "below" are sometimes used to characterize the relative positions of components. When these terms are used, reference is meant to the orientation of FIG. 1, i.e., the typical orientation of use for the assembly 1.

The liquid filter assembly 1 includes a housing 3: comprising a filter head 4 having a body 4a and a removable top or cover 5; and, a side wall 7, which in use depends from filter head 4. In general, the housing 3 defines an internal volume 8, in which: selected internal componentry as defined is contained; and, certain filtering and flow operations, as described herein below, occur. The liquid filter assembly 1 further includes a suction filter assembly 10, as defined herein.

The liquid filter assembly 1 includes, operably positioned therein, a serviceable filter cartridge arrangement 15. By the term "serviceable" in this context, it is meant that the filter cartridge 15 is removable and replaceable; i.e., it can be removed from the liquid filter arrangement 1, and be refurbished or be replaced, periodically, as desired. For the particular, preferred, liquid filter arrangement 1 shown, the serviceable filter cartridge 15 optionally includes two filter sections or components namely: a primary filter cartridge or cartridge section 17; and, a bypass filter cartridge or cartridge section 18. For the particular liquid filter assembly 1 depicted, the primary filter cartridge section 17 and bypass filter cartridge section 18 are secured to one another, and thus are removed and are serviced as an integral unit.

Arrangements are feasible, using selected ones of the principles disclosed herein, in which the primary filter cartridge or cartridge section 17 is not integrally attached to the bypass filter cartridge or cartridge section 18. However, the arrangement depicted, in which the two are permanently secured to one another (or are integral), is convenient and preferred.

The preferred serviceable filter cartridge assembly 15 further includes, as described below, an end cap and seal arrangement 20, which provides for a preferred mounting and sealing of the serviceable filter cartridge arrangement 15, within the liquid filter arrangement 1.

The preferred liquid filter assembly 1 depicted includes a bypass valve assembly 25, described below.

With respect to the assemblies described herein, in some instances reference will be made to "filtering flow." The term "filtering flow" in this context, is meant to refer to a flow which occurs with passage through media, to provide filtering to the liquid involved in the flow. Alternatively, in some instances reference will be made to "non-filtering" flow. The term "non-filtering" in this context, is meant to refer to a flow between locations, which does not involve passage through a filter media.

Referring still to FIG. 1, typical operation of the various components defined, will be understood from the following.

The filter head 4 generally includes a filter body 4a having an inlet or inlet arrangement 30 and an outlet or outlet arrangement 31. Herein, the liquid flow inlet arrangement 30 will sometimes be referred to as a circulation loop liquid flow inlet arrangement, since it is an inlet to the filter head 4 of liquid from a circulation loop in which the liquid circulates to perform its function. Similarly the outlet arrangement 31 will sometimes be referred to as a circulation loop liquid flow outlet arrangement, since it is an outlet for filtered liquid, from the filter head 4 and thus the assembly 1, for the liquid to be directed into a circulation loop to perform its function. In both instances, the terms are meant to distinguish an inlet/outlet arrangement, discussed below, referenced as the tank or reservoir inlet/outlet, which provides for liquid flow from the assembly 1 directly into a liquid reservoir or tank reservoir.

The particular assembly 1 depicted, has a single inlet aperture for inlet arrangement 30, and a single outlet aperture for outlet arrangement 31. It is noted that the inlet arrangement 30 could comprise multiple inlet apertures; and/or, the outlet arrangement 31 could comprise multiple outlet apertures. This would be a function of the number of hydraulic lines or circulation lines necessary, for the equipment in which assembly 1 is used.

Liquid to be filtered is directed into inlet arrangement 30 in the direction of arrow 30a. The unfiltered liquid then flows into annular unfiltered liquid volume 33, around the serviceable filter cartridge assembly 15. In general, volume 33 is referred to as an "unfiltered liquid volume," since the liquid received therein, will generally be received directly from a circulation loop, and will be unfiltered and require filtering. Referring to FIG. 1, it is noted that for the assembly 1 depicted, volume 33 can be considered to have three general regions: upper region 33a which is immediately surrounded by a portion of the filter head body 4a; middle region 33b which positioned between the housing side wall 7 and the primary filter cartridge or cartridge section 17; and, lower region 33c which is positioned between the housing side wall 7 and the bypass filter cartridge section 18.

In normal operation, from the unfiltered liquid volume 33, the liquid is passed through the primary filter cartridge 17 in the general directions of arrows 34, into central volume 35 defined by the serviceable filter cartridge 15. (This would be a filtering flow.) From the central volume 35 the liquid can pass out of the filter cartridge 15 in a direction of arrow 40 to outlet 31, and outwardly from the assembly 1 in the direction of arrow 41. (The flow from volume 35 through outlet 31 is a non-filtering flow.)

The operation described thus far is a normal operation in which the primary filter cartridge 17 has not been substantially occluded; and, the flow demands of the circulation loop or system in which the liquid filter assembly 1 is positioned are relatively constant both upstream and downstream of the liquid filter arrangement 1. Herein, the flow path indicated by arrow 30a and arrow 41, is generally referenced as a circulation loop for the operation of the equipment involved. Within that loop there may be a variety of pumps, valves and mechanical equipment to be operated. The invention in part concerns providing various mechanical arrangements within liquid filter assembly 1, to ensure that an appropriate level of fluid, and flow of fluid, in that circulation loop is maintained.

To address the event that liquid flow demands in the circulation loop downstream of the assembly 1, i.e., in the direction of arrow 41, are not sufficiently great to require all filtered liquid entering in path 30a to be directed into the circulation loop by passage (after filtering) through outlet 31, an alternate flow direction is provided. In particular, flow from central volume 35 can be directed outwardly from the housing side wall 3, and eventually outwardly from the assembly 1 and into a reservoir, by passage through a housing reservoir outlet/inlet 42. The term "outlet/inlet" (or alternatively "inlet/outlet") in this context, is meant to indicate that the passage way 42 is configured to allow flow from housing 7 to exit to the reservoir, or flow to enter housing 7 from the reservoir, depending on operating circumstances. This is described in greater detail below. The typical reservoir is a tank reservoir, as referenced below.

More specifically, for the assembly 1 depicted, flow from the central volume 35 can be directed through a tube or center stand pipe 45, in particular through central flow channel 45a in the stand pipe 45, in the direction of arrow 46 through flow/pressure regulation arrangement 47 and outwardly from the assembly 1 by passage through outlet 48 of the suction filter assembly 10, in the direction of arrow 49. (Flow from volume 35 through outlet 48 is a non-filtering flow.)

In a typical operation, the flow path indicated by arrow 49 would be a liquid flow exit from assembly 1 into a reservoir tank, not shown in FIG. 1. In typical use, although alternatives are possible, a liquid filter assembly 1 in accord with the principles described herein, would be mounted on a reservoir tank with suction filter assembly 10 submerged in the reservoir. Such arrangements are sometimes referred to as "in-tank" assemblies.

With the particular, preferred, liquid filter assembly 1 depicted, flow/pressure regulation valve arrangement 47 is conveniently positioned within the suction filter assembly 10, as described in detail below, although alternatives are possible.

From the above descriptions, it can also be expected that in some circumstances, there may be a flow demand increase downstream of the liquid filter arrangement 1, relative to the liquid volume and flow going into inlet arrangement 30. When this occurs, liquid will be drawn from the reservoir in the directions of arrows 50, eventually through the housing reservoir inlet/outlet 42 into central volume 35. Such a flow will generally be through suction filter 51, in suction filter arrangement 10, and is a filtering flow. A directionally biased valve arrangement 54, preferably as described in detail below, is provided in the suction flow path. The directionally biased valve arrangement 54 allows for entrance of liquid into region 35, but inhibits liquid flow in an opposite direction, so as not to override or disable or proper bypass operation of flow/pressure regulation valve arrangement 47. The preferred directionally biased valve arrangement 54 depicted, is a non-helical spring, valve arrangement. By the term "non-helical spring" in this context, it is meant that the valve closure pressure is not provided by a helical, coiled, spring. This is preferred, for convenient operation and assembly. A particular, convenient, non-helical spring, valve arrangement, is described in detail below.

To protect the equipment in the circulation loop, in circumstances in which the primary filter cartridge section 17 becomes occluded to an undesirable level, a bypass filter arrangement 55 is provided. The bypass filter arrangement 55 includes bypass filter 18 and bypass control valve arrangement 25. In general, should the pressure differential across media 17a in primary filter cartridge section 17 (outside or unfiltered side 17b to inside or filtered side 17c) become sufficiently high, the bypass control valve 25 is configured to open, to allow liquid flow through bypass filter media 18a in cartridge section 18 and into central volume 35, as a filtering flow but without passage through filter media 17a in primary filter cartridge section 17. This flow can then proceed, in the direction of arrow 40, FIG. 1, through outlet arrangement 31, or into the reservoir by passage through reservoir inlet/outlet 42 and then from assembly 1 via the pathway of arrow 49. (A liquid pressure differential that opens the bypass valve will sometimes be referenced as a "bypass valve liquid opening pressure.")

Now that the basic operation, and general components, of the liquid filter assembly 1 are understood, a more detailed examination will be made of selected component parts. Attention is first directed to the features of the housing 3. For a typical liquid filter assembly 1, filter head 4 will be a cast member, for example made from cast aluminum or other material. Cover 5 is threadably secured to the filter head 4, to close service aperture 5a, with a seal provided by o-ring 60. The cover 5 includes an outer, nut shaped, projection 61 for engagement by a wrench or other tool.

Although alternatives are possible, the cover 5 includes, positioned internally and centrally, a stem 62, configured to project into a central volume 4b of filter head 4. In use, the stem 62 is positioned and sized to press against an upper most portion 15a of a serviceable filter cartridge 15 positioned internally of the housing 3, to ensure that the serviceable filter cartridge 15 is positioned, in extension into the housing 3, at an appropriate position and, to ensure that the cartridge 15 cannot be moved out of its operational (sealed) position. This will be described below in more detail, in connection with the filter cartridge 15.

The side wall portion 7 of the liquid filter assembly 1 depicted, is separable from the filter head 4. In particular, the body 4a of filter head 4 includes an aperture 63 therein positioned on opposite side or direction of the filter head body 4a from the service aperture 5a and cover 5. The sidewall section 7, projects through, and outwardly from (in use downwardly from), the aperture 63.

Figure 1B:
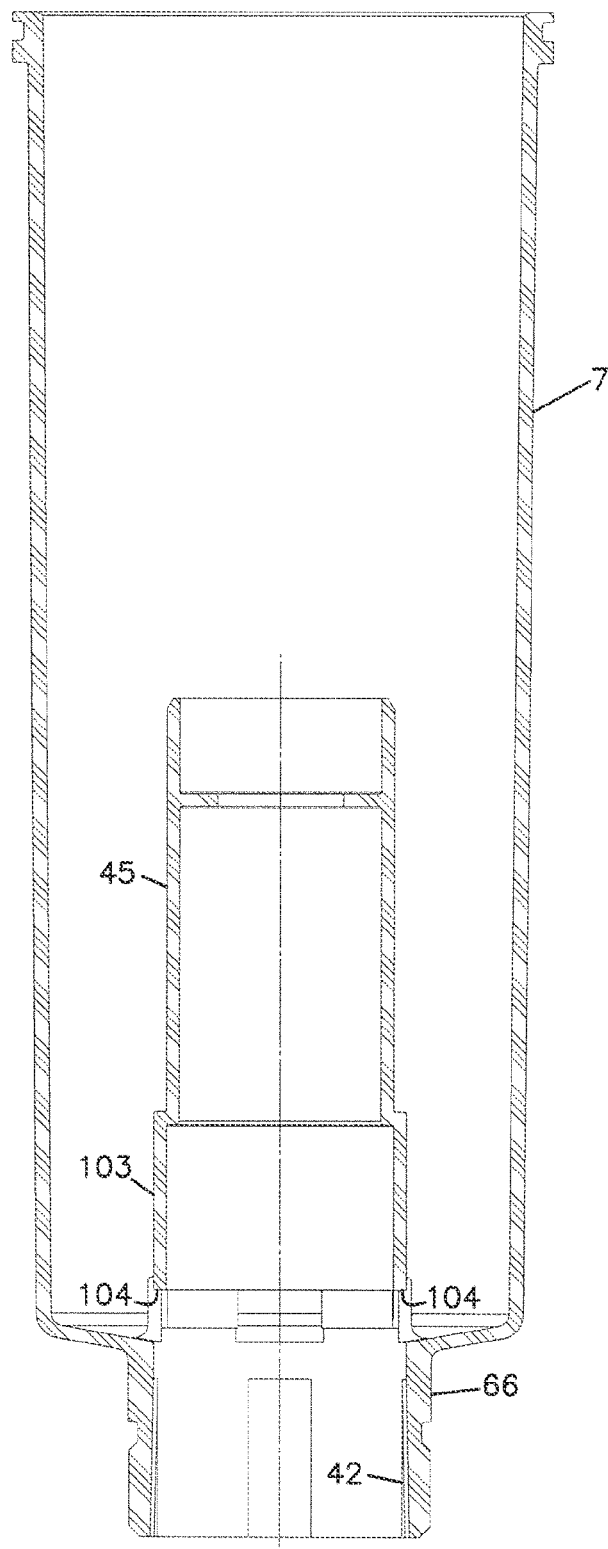
FIG. 1B is a cross-sectional view of a component useable in the embodiment of FIG. 1.
Figure 1C:
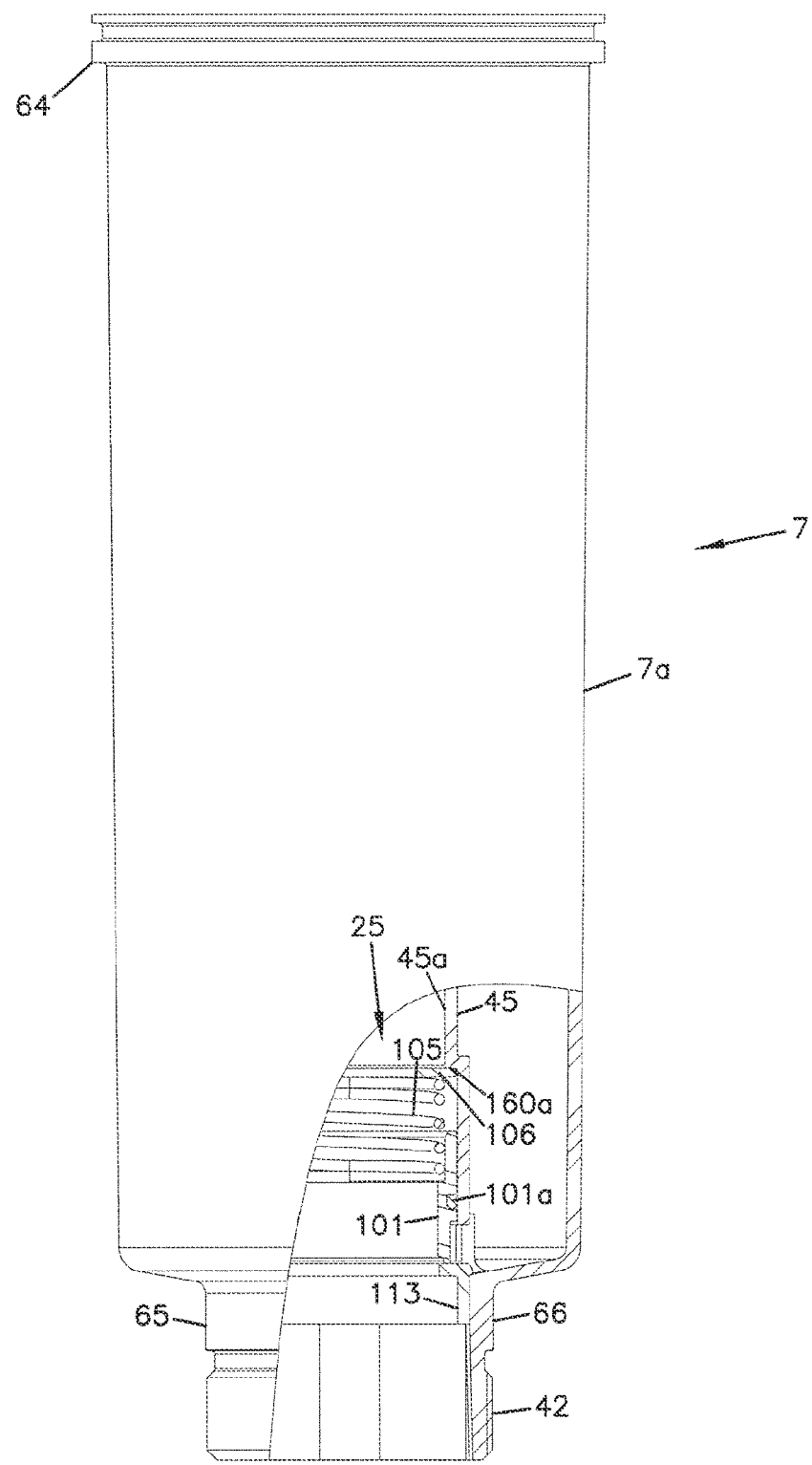
FIG. 1C is an enlarged, partially cross-sectional view of the component of FIG. 1B, having a bypass valve assembly mounted therein.

The sidewall section 7, is depicted in FIG. 1C. Although alternatives are possible, in a preferred arrangement, FIG. 1C, the side wall section 7 comprises a molded plastic component having a shoulder 64 (at an upper end in use) and an opposite (in use bottom) end 65. The side wall section 7 includes a projecting tube 66 which defines the reservoir inlet/outlet 42. In preferred arrangements of the type depicted in FIG. 1, tube 66 will typically have a smaller cross-sectional area, than side wall section 7a. In a typical embodiment, the side wall section 7a and tube 66 will be circular in cross section, with a diameter of tube 66 being at least 10%, typically at least 25% and usually at least 30%, smaller than region 7a of side wall section 7 located above end 65. (It is noted that the sidewall portion 7, FIG. 3, differs from the arrangement of FIG. 1 with respect to specific features for attachment to assembly 10. This is discussed below.)

As will be apparent from the descriptions below, the smaller diameter of tube 66 relative to side wall section 7a, provides that a suction filter assembly 10 can be attached, to the tube 66, without an overall resulting diameter being generated that is larger than aperture 63. This allows for convenient assembly, as discussed below.

The side wall 7 is sized such that, during assembly, when the top 5 is removed from body 4a, FIG. 1, the side wall 3 can be pushed into the housing 3 through the opening 5a provided by the absence of the cover 5, until the shoulder 64 engages shoulder 67 in the filter head 4. Shoulder 64 in the sidewall section 7 is provided with a seal member, for example o-ring 68, FIG. 1 to provide for a seal at this location.

Attention is now directed to the serviceable filter cartridge 15, FIG. 1. In general the serviceable filter cartridge 15 includes a second (upper in use) end cap and seal arrangement 20, as indicated previously. The end cap and seal arrangement 20, for the particular embodiment depicted, are mounted on an end (in use upper end 70) of the primary filter cartridge 17. The end cap and seal arrangement 20 includes an end cap portion 71 which, for example, can be a molded member secured (i.e., potted) to the primary filter cartridge 17. The end cap portion 71 includes a central aperture 72, for passage therethrough of liquid (from region 35) to be directed in the direction of arrow 40 to circulation loop outlet 31. The end cap portion 71 includes, mounted with a portion in extension over central aperture 72, a projection 72a, which in this instance is a yoke. The projection 72a is configured to project in an opposite direction (from end cap portion 71), from primary cartridge media 17a. The projection 72a is configured to be engaged by projection 62 in cover 5, in use. The projection 72a would have, typically, a central aperture 72b, to receive a portion of projection 62.

For the arrangement shown, the aperture 72b is defined by a step, to limit the extent to which the projection 62 can enter aperture 72.

The end cap 70 also includes a mounting ring 73 and a seal 74. In this instance the seal 74 comprises o-ring 75. Although alternatives are possible, for the particular embodiment shown in FIG. 1, the mounting ring 73 is directed outwardly from a remainder of the end cap 71 and is positioned to secure the seal 74 to define a seal plane that is not orthogonal (or non-orthogonal) to a central axis 78 of the primary filter cartridge 17 (or assembly 1). The term "seal plane" as used in this context, it is meant to refer to a plane in which the material which forms the seal, rests. For example a plane defined by an o-ring 75 is shown at 75a. That is, the plane 75a in which the o-ring sits, will be referred to as the seal plane in this context. The term "seal plane" is not meant to refer to the direction of the seal (radially outwardly, radially inwardly or axially). The term is also not meant to refer to the surface of engagement defined between the seal and the housing. The term "seal plane" is merely meant to refer to a plane 75a defined by the seal member, for example o-ring 75, which creates the seal. The term "non-orthogonal" and variants thereof, in this context is merely meant to refer to a seal plane that does not extend at an angle A of 90° to the axis 78. It may alternatively be said that the seal plane 75a extends at an oblique angle to the axis 78.

In the embodiment of FIG. 1, as a result of the non-orthogonal or oblique angle, the mounting ring 73 divides the internal volume 4a of the filter head 4 into an inlet volume 79 and an outlet volume 80, separated by the o-ring 75. The positioning of the mounting ring 73 (to define a seal plane non-orthogonal to the central axis 78) allows for a construction in which the inlet arrangement 30 and outlet arrangement 31 can be positioned generally oppositely to one another in the filter head 4 while not needing to be spaced apart, vertically, at all, or at least not to a great extent. For the particular embodiment depicted in FIG. 1, a center line 30b for the inlet aperture arrangement 30 is in a plane below a center line 31b for the outlet flow arrangement 31, although alternatives are possible.

Typically, the mounting ring 73 will define a seal plane 75a for seal 74 in which the seal 74 defines a circle in a plane at an upper, acute, angle of about 30-60°, inclusive, relative to axis 78, typically about 40°-50°, inclusive (for example about 45°). The term "upper" in this context, is meant to refer to an angle between the seal plane and the central axis 78, above the seal plane 75. The term "acute" in this context, is meant to refer to the smallest or less than 90° projection angle between the plane 75 and the axis 78, of the two upper angles. In FIG. 1, the oblique (upper, acute) angle is indicated generally at "A."

The end cap 71, including the mounting ring 73, can be molded from a variety of moldable plastic materials, for example a polyamide (PA). A glass filled polyamide (15-30% glass filled by wt.) would, for example, be useable. Of course analogously functioning structure could be fabricated from metal components.

Still referring to FIG. 1, it is noted that end cap 71 further includes a shield projection 71a thereon. The seal projection 71a projects downwardly along an outside 17b of the media 17a generally a length of extension far enough to extend to a point 71b at or below a lower most extent of inlet arrangement 30 and outlet arrangement 31. Although alternatives are possible, this will accommodate the seal support or mounting ring 73. It also will inhibit fluid entering inlet arrangement 30 from directly impinging upon the media 17a at this location. For a typical cartridge 15, wall or shield projection 71a will extend a distance, along outer surface 17b of the media 17, a distance of at least 15 mm., typically about 25 to 40 mm.

For the particular arrangement shown in FIG. 1, filter media 17a of the primary filter cartridge section 17 is secured to, and in operable assembly and orientation depends from, the end cap 71. A variety of constructions can be used for the media 17a of the primary filter cartridge section 17. It is anticipated that for a typical liquid filter operations, a pleated media 84 configured in a generally cylindrical shape around an open center volume, will be used and preferred. The media may be selected from many of a variety of types of media, now known or later developed, for liquid filter applications. Typically the media will comprise a non-woven fibrous material, for example cellulose fibers, synthetic fibers, glass fibers or a mixture thereof. Such materials are widely known for use in liquid filtering. Typical pleat sizes would be about 6-15 mm., although variations are possible.

A central support or inner support 85 may be positioned along an inside 17c of the pleated media 17, for support. A perforated metal liner, or expanded metal liner, can be used, for the inner support 85. If a metal inner liner is used, the inner liner may, as an example, comprise a porous coiled metal strip, with inner locking edges. If a metal-free or reduced metal configuration is desired for the serviceable cartridge 15, an extruded, perforated or porous liner can be used.

The media 17 may be contained within a mesh or similar structure, if desired. The mesh may comprise a metal wire mesh or a plastic mesh, as preferred.

It is noted that in some instances it is preferred to manufacture serviceable filter cartridges from reduced metal or metal-free components, so as to facilitate disposal. It is an advantage to arrangements according to the present disclosure, that the replaceable or serviceable part, i.e., the filter cartridge 15, can be manufactured in a reduced metal or metal-free form. Herein the serviceable filter cartridge 15 will be considered a "reduced metal" component, if it contains no more than 3%, by wt., metal. It will be considered metal-free, if it includes no more than 0.1%, by weight, metal.

In some assemblies it may be desirable to provide the primary filter cartridge 17 with an upstream outer liner, or a liner/valve construction, in accord with the descriptions of the PCT Application No. PCT/US03/19112, filed Jun. 18, 2003, entitled "ARRANGEMENT FOR CONTAINING FILTER CONTAMINANT; ASSEMBLY; AND METHODS," identifying Johan Fobe, Enrico Greco and Julien Dils as inventors and having a priority claim to U.S. Ser. No. 60/390,856 filed Jun. 21, 2002 and published as PCT WO 04/000436 on Dec. 31, 2003; hereinafter "the WO/04/000436 publication;" incorporated herein by reference.

At an end opposite end cap 71, the primary filter media 17 is secured to end cap 88. End cap 88 is open, having a central aperture 89. This end cap is shown in greater detail in FIG. 1A. FIG. 1A is an enlarged fragmentary view of a portion of FIG. 1.

Referring to FIG. 1A, end cap 88 includes a seal 90, in this instance an inner seal formed from o-ring 91. The seal 90 is positioned to seal against a portion of, or structure in, the housing, in this instance the seal being against inner or center stand pipe 45, since end cap 88 is an open end cap.

Herein, a seal will be considered "radially directed," if the seal provided is directed toward or away from central axis 78. For the particular embodiment depicted in FIG. 1A, the inner seal 90 is a radially directed seal, or radial seal. The particular seal 90 depicted is an inwardly directed seal, when defined with respect to the sealing force from end cap 88, to which it is attached. In use, it would seal against a structure projecting through an aperture defined by end cap 88.

Still referring to FIG. 1A, attention is now directed to the bypass filter 18. The bypass filter 18 comprises a filter media 94 positioned in extension between opposite end caps 88 and 95. End cap 88, which forms an upper end cap (when operably installed) for the bypass filter 18, comprises a lower end cap (when operably installed) for the primary filter media 17a, for the embodiment shown. Preferably both the primary filter cartridge media section 17a and the bypass filter cartridge section 18 are non-removably secured to the end cap 88. Herein the term "non-removably secured" in this context, is meant to refer to a connection that cannot be broken without damage to one of the components involved (i.e., one of the filters or the end cap itself). Typically the bypass filter cartridge section 18 and the primary filter cartridge media section 17a would be secured to the end cap 88 by being potted in the material of the end cap 88, or by having end cap 88 molded-in-place on the media.

End cap 95, a third end cap, is an open end cap, having open central aperture 96. For a typical bypass arrangement, the media 94 would comprise a plastic or wire screen 93, or similar construction. Generally the media 94 is not intended for long term filtering flow operation, but only to ensure the equipment is appropriately protected during a period in which the primary filter media section 17 has become occluded to an extent that a bypass flow in operation is needed.

In a typical application, the axial length of the media 17a of the primary filter media section 17, i.e., the length in the direction of axis 78, will be at least 3 times (typically at least 4 times) the axial length of the bypass filter media section 18.

Referring to FIG. 1A, lower end cap 95 is provided with an optional outwardly directed lip 98, positioned such that, when serviceable filter cartridge 15 is drawn upwardly through housing 3, FIG. 1, the lip 98 can catch sediment in annular volume 33 for removal from assembly 1.

Herein, an outwardly directed structure 98 on an end cap such as end cap 95, which is directed to collect contaminant during withdrawal of the filter cartridge 15 from the housing 3, will sometimes be referred to as a "contaminant collection arrangement" or by similar terminology. The terminology is not meant to indicate any specific structure, other than an outward projection configured to capture or collect contaminant. The particular arrangement 98 depicted in FIG. 1, is an outwardly directed lip sized to engage an inner surface of the side wall 7 and having no apertures therethrough. Thus, sediment in region 33 is directed above lip 98, and liquid in region 33 into bypass filter 18, when the cartridge 15 is listed out of housing 4.

Figure 9:
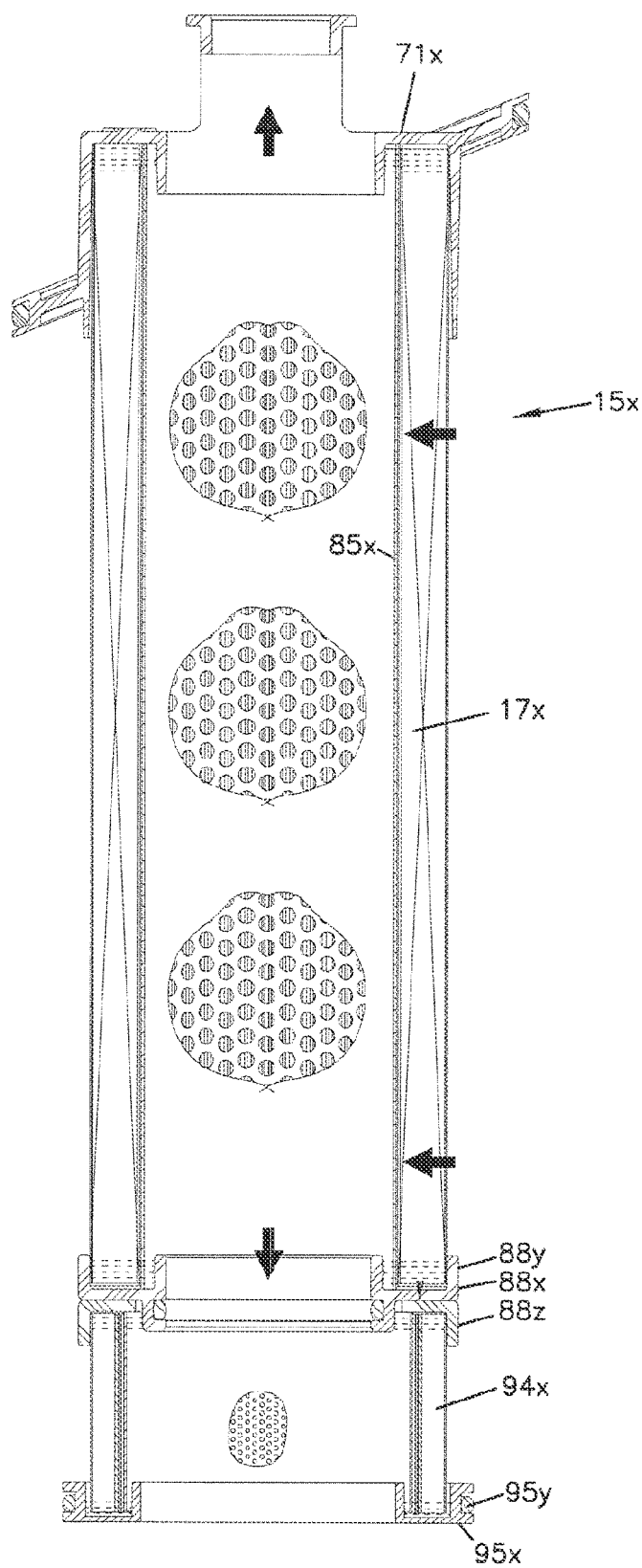
FIG. 9 is a cross-sectional view of an alternate filter replacement part for the assembly of FIG. 1.

Attention is now directed to FIG. 9. In FIG. 9, an alternate filter cartridge 15x is depicted. The filter cartridge 15x includes components analogous to those previously described for filter cartridge 95, and thus, for example, includes primary filter media 17x, inner liner 85x, end caps 71x and 88x. Round end cap 95x, not having outwardly directed lip structure 98 depicted in FIG. 1A, instead includes, as an outwardly directed structure, o-ring 95y. The o-ring 95y will provide a seal with sidewall 7, FIG. 1, when filter cartridge 15x is installed, and will serve a similar function to outwardly directed structure 98.

Referring to FIG. 9, it is noted that end cap 88x comprises a combination of end cap 88y on media 17x, and end cap 88z on media 94x. Of course, if desired, end cap sections 88y and 88z can be secured together by welding adhesive of the like, to form an integral unit. If made of separate pieces, they sometimes preferably would be secured together: to avoid leakage therebetween; and, to ensure that element 15x is installed and removed, as a single serviceable piece, when desired. Of course end cap 88x could be made as a single molded piece.

Referring again to FIG. 1, from the previous descriptions, it can be seen that during a servicing operation, cover 5 would be removed, and the serviceable filter cartridge 15 (or 15x), comprising the primary filter cartridge 17 (or 17x) and the bypass filter 18 (or 18x), would be removed. A new filter cartridge (typically analogous in configuration to the removed cartridge 15 or 15x) would then be reinserted. The new filter cartridge 15 (or 15x) would be pushed downwardly into housing 3 until it seats with seal 90 against center pipe 45. The cover 5 can be then returned, with center stem 62 pressed against projection 72a on end cap 71 (or analogously on cartridge 15x). Rotational orientation of the serviceable filter cartridge 15 (or 15x), for proper positioning of the mounting ring 73, can be facilitated by providing a shoulder 73a within filter head 4 having a shape also at an oblique (non-orthogonal) angle to the center axis 78, so that the filter cartridge 15 (or 15x) can only be nested in one radial orientation around the axis 78. Generally, projection tip 62a on projection 62, FIG. 1, is sized to be received within aperture 72b in projection 72a, in a rotationally slidable manner. Thus, cover 5 can be rotated, even though, once installed, filter cartridge 15 (or 15x) cannot be rotated due to the arrangement between mounting ring 73 and shoulder 73a.

Proper operation of the bypass filter 18, is controlled by the bypass valve assembly 25, FIG. 1A. The bypass valve assembly 25 is contained within housing 3, and, for the embodiment shown, it is not removed and replaced during servicing of the filter cartridge 15 (or 15x). That is, bypass valve assembly 25 is configured and positioned to remain with the housing 3, during servicing operation.

Still referring to FIG. 1A, the bypass valve assembly 25 comprises a valve member 100, in this instance a tubular valve member 101 slidably positioned within seat 102. For the example shown, the seat 102 comprises a lower portion 103 of center pipe 45, although alternatives are possible. In the example shown, the lower portion 103 has a slightly larger internal diameter (i.d.) than an upper portion 103a.

The valve member 100 is slidably positioned to open or close an aperture arrangement 104, in lower portion 103. The bypass valve assembly 25 is provided with a control biasing member (in this example a helical spring) 105 positioned under compression between ring 106 (in particular at internal shoulder 106a, in center pipe 45, in this example at a region of transition between portions 103 and 103a, of tube or pipe 45), and shoulder 107, on tubular valve 101. If the pressure in region 109, in particular operating on shoulder 110 of valve member 100 becomes sufficiently large relative to pressure in volume 35, the closing force of the control spring 105 will be overcome, the valve member 100 will slide in the direction of arrow 111, to open apertures 104 to liquid flow therethrough. This opening of the apertures 104 allows for a bypass flow through media 94, into center pipe 45. From there, of course, the liquid flow can either flow through region 35 and out to outlet arrangement 31 in the filter head 4, FIG. 1, or into the tank reservoir via flow path 49, FIG. 1, and upon exit through reservoir inlet/outlet 42. Typically, the bypass valve assembly 25 will be configured to open under a differential pressure defined by the equipment manufacturer, of the system in which the filter assembly 1 is installed.

Referring to FIG. 1A, o-ring 101a, is positioned around tubular valve member 101, to provide a seal against region 103.

Further understanding of the bypass valve arrangement can be understood by reference to FIGS. 1B, 1C and 1D. In these Figs., the componentry is analogous to those shown in FIGS. 1 and 1A, except for differences in detail. However the basic components and operation are the same, and are numbered accordingly. It is noted that stem 66, FIGS. 1B-1D, is configured for attachment to further subassembly described below, in a different manner.

As indicated previously, at end 65 side wall 7 includes, projecting therefrom, a tube section 66 preferably of smaller diameter or cross-sectional area, then region 7a. Within region 66, for the embodiment shown, is positioned a stay structure or ring 113, FIG. 1C, mounted in tube 66, to contain the bypass assembly 25 in operable position. The ring 113 can be mounted, after the bypass valve assembly 25 is inserted into lower region 103 of tube 45, in a variety of ways, for example through sonic welding, if ring 113 and the tube 7 are both made from appropriate plastic materials; or, by using snap fit.

In general terms, end cap 88, FIG. 1A, between the primary filter cartridge section 17 and the bypass filter cartridge section 18, can be viewed as a first end cap having a seal 90 thereon, engaging the housing, in this instance center tube 45, to separate the tube 45 between an upper section 103a and a lower section 103. The upper section 103a will generally have an imperforate side wall (and an open end 103b) and the lower section 103 would have apertures 104 therein (and an open end 103c). End cap 71 can be viewed as a second end cap, positioned at an opposite end of media 17a of the first end cap 88. End cap 95 can be viewed as a third end cap, positioned at an opposite end of bypass filter cartridge section 18 from the first end cap 88.

Attention is now directed to structural features attached to an outlet end 66a, of tube 66, FIG. 1. That is, in normal operation, the equipment now characterized will be in operable position below side wall section 7, during operable assembly, typically submerged within a tank reservoir. With respect to this description, attention is directed to FIG. 3, which is an enlarged, fragmentary, cross-sectional view of a portion of FIG. 1.

Figure 3:
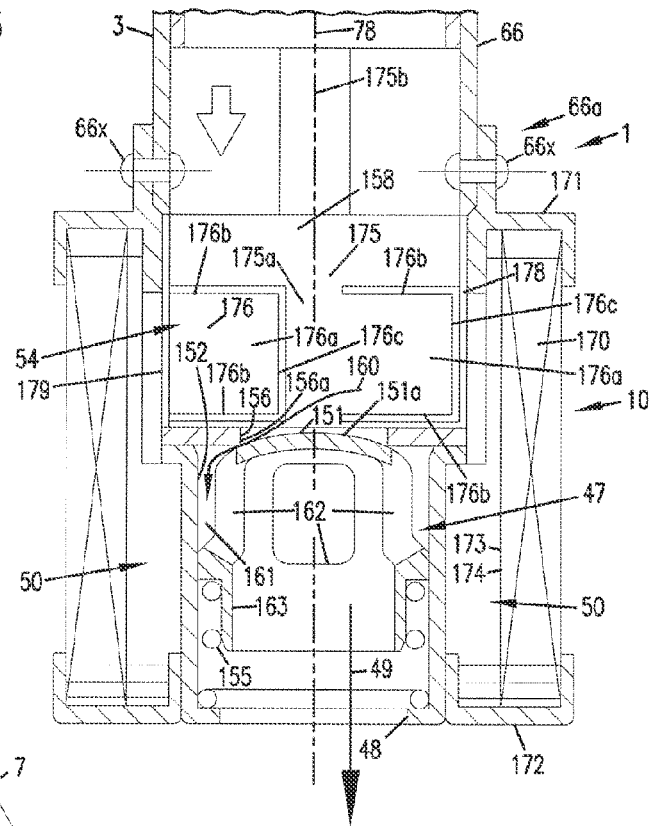
FIG. 3 is an enlarged, fragmentary, cross-sectional view of a portion of FIG. 1.

In this region of the assembly 1, FIG. 3, attention is first directed to the flow/pressure regulation valve assembly 47. The flow regulation valve assembly 47 includes a valve member 151 mounted within a housing 152. The housing 152 is secured to lower outlet end 66a of housing 3. The valve member 151 is positioned (under biasing pressure or control by a biasing member, in this instance helical (coiled) spring 155), into a sealing engagement between top 151a and aperture 156, in circular seat 156a. If the pressure within volume 158 (i.e., the pressure differential across aperture 156) exceeds the opening pressure, the valve 151 will move out of sealing engagement with aperture 156, to allow flow in the direction of arrow 160 into region 161, after which the flow can then pass through apertures 162 in valve member 151 into center region 163, underneath valve top 151a and outwardly from the liquid filter assembly 1, through outlet 48 in the direction of arrow 49, to the tank (liquid) reservoir. Typically, the flow/pressure regulation valve assembly will be configured to open at a selected pressure differential within the range of 0.3-0.7 bar, for example 0.5 bar.

As indicated previously, the particular liquid filter assembly 1 depicted, includes a suction filter arrangement 10. The suction filter arrangement 10 includes media 170, in this instance positioned in extension between opposite end caps 171 and 172, to surround and define a central volume 173. The media 170 would typically comprise a cylindrical wire mesh or plastic mesh media, typically pleated, supported by a porous inner liner 174. A variety of alternate media arrangements can be used for the media 170, including for example non-woven media of cellulose synthetic or glass fibers. Non-pleated arrangements can also be used. The choice of media would typically be made for the particular environment of use. However for a typical environment involving hydraulic fluids, the intake filter assembly would typically use a wire mesh or plastic mesh screen.

The end caps 171, 172 can be molded from a polymeric material, such as a polyamide, typically a glass-filled (for example 15-30% glass filled, by wt.) polyamide. When fashioned this way, they can be conveniently secured, during molding, to the media 170. Alternatively, end caps 171, 172 can be fabricated metal parts, secured by potting with adhesive.

End cap 171 is shown secured to extension 66, for example by rivets 66x although alternate means of securement (such as adhesive or sonic weld) can be used. An additional seal between end cap 171 and tube 66, if desired, could be provided by a gasket at region or joint 176. (In FIGS. 3A-3B discussed below, an alternate way of connecting parts that perform these functions is shown.)

For typical preferred arrangements according to the present disclosure, the media 170, again, is configured in a cylindrical form, around a central longitudinal axis 175b. The typical "directionally biased valve arrangement" which utilizes cut valves or flaps, is configured so that the flaps open for movement toward the central axis 175b. This is described in greater detail below.

Referring again to FIG. 3, preferably, the outside dimensions for the suction filter arrangement 10 are such that the suction filter arrangement 10 can be pushed through aperture 63, FIG. 1, along with side wall 7, during assembly. That is, the suction filter arrangement 10 can be mounted on the side wall 7 prior to the side wall 7 being installed in the filter head 4, FIG. 1.

Returning to FIG. 3, suction filter arrangement 10 includes, positioned therein, a directionally biased valve arrangement 54. Herein the term "directionally biased valve arrangement" is meant to refer to a valve arrangement that readily allows liquid flow therethrough in one direction, but generally is configured to inhibit or resist liquid flow therethrough in an opposite direction. A variety of mechanisms can be used to provide for such a directionally biased valve arrangement. The particular one depicted, is a non-helically coiled spring arrangement (or non-helical spring arrangement) that utilizes one or more cut valves (typically flaps) that can open in one direction, but generally not in an opposite direction as described.

The term "non-helically coiled spring arrangement," and variants thereof, in this context, is meant to refer to directionally biased valve arrangement that does not utilize a helically coiled spring to maintain closure of the valves. The term "flaps" in this context, as will be apparent from the more detailed discussion below, references valve members that can swing or pivot open and closed, as described below.

The term "directionally biased valve arrangement," and variants thereof, in this context, refers to an arrangement other than a simple perforated liner, which is equally open to flow in either direction. A particular configuration is discussed below.

For typical preferred arrangements according to the present disclosure, the media 170, again, is configured in a cylindrical form, around a central longitudinal axis 175b.

The typical "directionally biased valve arrangement," which utilizes cut valves or flaps, is configured so that the flaps open for movement toward the central axis 175b. This is described in greater detail below.

Although alternatives are possible, for the particular arrangement depicted, the directionally biased, non-helically coiled spring, valve arrangement 54 is positioned within central volume 173, is surrounded by media 170, and is configured so that flow from media 170 into tube 66, is relatively easy, by comparison to reverse flow, i.e., flow from inside tube 66 through the valve arrangement 54 directly to media 170.

The particular directionally biased valve assembly 54 shown, comprises: (a) ring-shaped valve member 175, defining an internal volume 175a around central axis 175b (corresponding in this instance to axis 78) and including at least one and typically a plurality of cut valves 176 therein; and, (b) an outer support 178 having at least one and typically a plurality of apertures 179 therein. The ring-shaped valve member 175 is positioned within the outer support 178, for proper operation. The cut valves 176 are preferably configured so that they can be biased to open by pivoting (in this instance the flaps 176a can pivot open toward center axis 78). Preferred cut valves 176 have a generally u-shaped orientation, such as that shown. The particular cut valves 176 depicted have a "boxed" u-shape orientation, with each of the centers of the u-shaped cuts, pointed in the same direction around axis 78. By "boxed" in this context, it is meant that the cut valve 176 is formed from three straight cuts, and it is not meant that any particular angles between side cuts 176b and the center cut 176c are required. A variety of alternate cut valve shapes can be used, including, for example, curved u-shapes; i.e., u-shapes with curved center cuts. For the embodiment shown, the u-shaped flaps point around the axis 175b (the term "point" is meant to refer to the direction each u-shape is directed, if it is viewed as an arrow, with edge 176c being the lead edge).

A variety of materials can be used for the ring member 175, a particular preferred material would be spring steel, for example spring steel having a thickness of about 0.05 to 0.2 mm., typically about 0.1 mm. A single piece of spring steel can be used for the ring member 173, the spring steel piece having been curved in a desired shape to be positioned within the outer support 178.

In general, the outer support 178 has a sufficient internal diameter, to contain the ring member 175 securely therein. The apertures in the outer support 178 are preferably positioned and sized so as to be covered by the cut valves 176 in operation. A mechanical index can be provided between the ring member 175 and outer support 178, for example by providing a rib on the outer support 178 which projects toward center line 78, and by also providing the ring with a gap to engage the rib. Such an indexing arrangement between an outer support and a valve sheet having cut valves therein, is described for example in PCT Publication WO 04/000436, for a different type of assembly.

It is noted that, as indicated above, some of the features of the directionally biased valve arrangement 54 may be analogous to features for a valve arrangement described in the WO 04/000436 PCT publication. However, when arranged as shown in FIG. 3, the operational purpose to the valve arrangement 54 is substantially different from those described in the WO 04/000436 PCT publication. In particular, the valve arrangements described in the WO 04/000436 PCT publication, are generally positioned at an upstream side of media in a main filter element, for example around the outside of a cylindrical media, to contain contaminant against the media in use and during servicing. The valve arrangement 54 described in the current application, is positioned in a part that is not normally changed out during servicing. Also, although alternatives are possible, it is downstream of the media 170 with which it is associated. The purpose of the valve arrangement 54 is to allow liquid flow in one direction, and to inhibit reverse liquid flow. The valve arrangement 54 when positioned as shown has no contaminant containment purpose. In fact in the example shown it is located in a filtered liquid volume, although alternatives are possible.

Even if the valve arrangement 54 were positioned around the outside of media 170, its operation would still be primarily different from that if the arrangements of WO 04/000436 PCT publication, since its operation in connection with the principles described herein, would be to manage a portion of filter flow, as opposed to flow with respect to a main or primary serviceable filter cartridge.

Referring to FIG. 3, in general, flow in a direction opposite to arrows 50, i.e., from region 173 through the media 170, is inhibited by the cut valves 176, since they cannot readily be biased open by outward movement, i.e., away from center line 78, due to the presence of the outer support 178. As a result, the combination of the ring member 175, with the cut valves therein, and the outer support 178, provides for a directionally biased valve arrangement; i.e., it provides for less resistance to liquid flow in the direction from media 170 to volume 35, then in the opposite direction, without use of a helically coiled spring.

To facilitate a one-way operation for the flaps 176a, outer support 178 is preferably configured with a structural portion overlapped by the flaps 176a.

Still referring to FIG. 3, it is noted that for the particular assembly 10 depicted, the upper end cap 171 is integral with componentry which defines the outer support 178. Of course alternate configurations are possible. One such arrangement is shown in FIG. 4.

Figure 4:
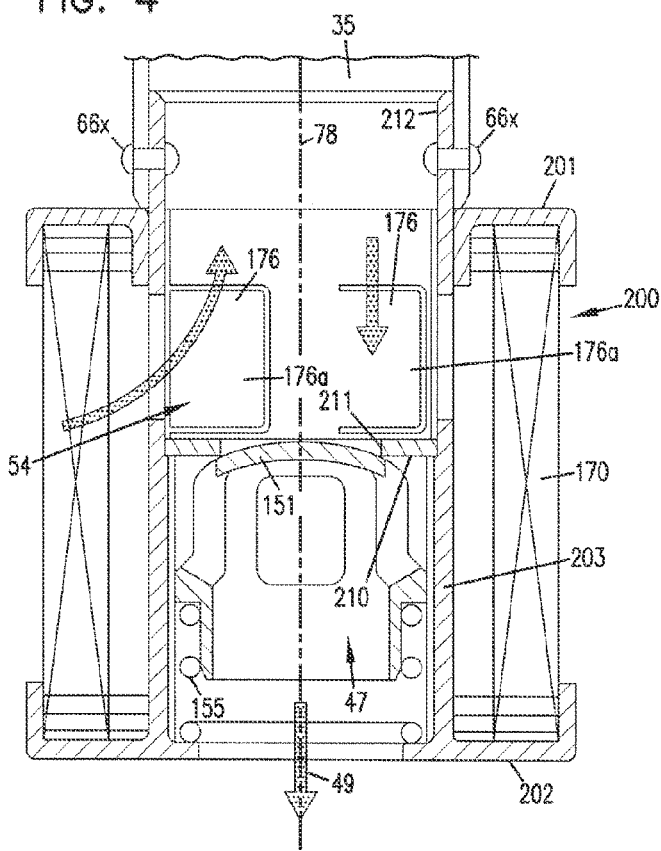
FIG. 4 is a view analogous to FIG. 3, of an alternate assembly usable with the arrangement of FIG. 1.

Referring to FIG. 4, like numerals are used to indicate analogous componentry. The basic difference between the assembly of FIG. 4 and the assembly of FIG. 3 relates to selected structural shapes and joints. In particular the media 170 for the suction valve arrangement 200 is shown extending between end cap 201 and end cap 202. End cap 202 is integral with a side wall 203 in which the flow/pressure regulation valve assembly 47 and directionally biased valve assembly 54 are positioned. These components 47, 54 may be as generally described above. Disk or ring 210 provides both: for a sealing seat at aperture 211, for the flow/pressure regulation valve assembly 47; and, also, as a base for the directionally based valve assembly 54. Disc 210 can be inserted through end 212, after the flow/pressure regulation valve assembly 47 has been inserted.

From a comparison of FIGS. 3 and 4, a variety of possible componentry configurations and assemblies will be understood. One particular set is illustrated in FIG. 5.

Figure 5:
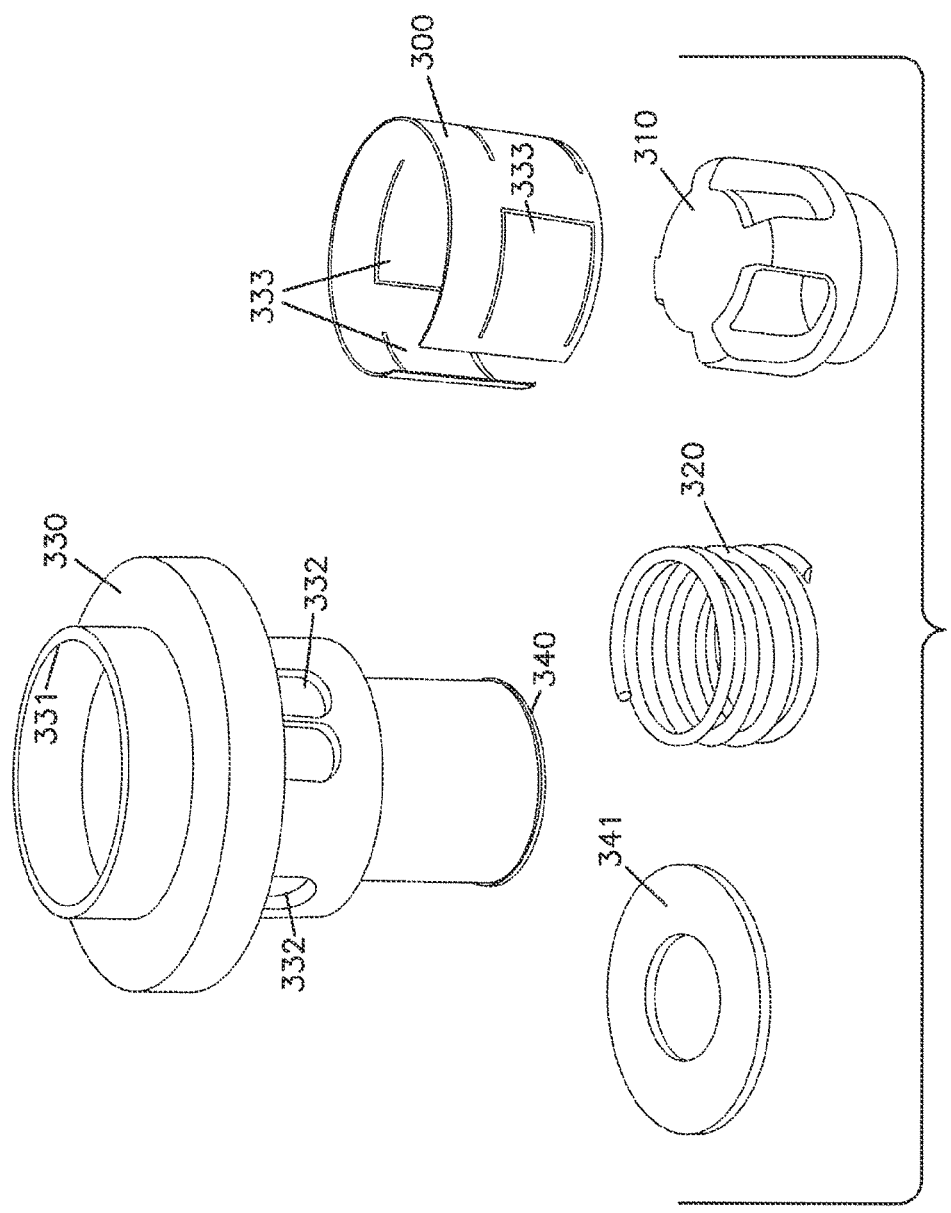
FIG. 5 is a depiction of a collection of components that can be assembled to provide a subassembly usable in an arrangement according to the principles of FIG. 1.

In FIG. 5, components of a pressure regulation valve arrangement and suction valve assembly (usable in arrangements as characterized herein) are shown. Referring to FIG. 5, a ring member is depicted at 300. The ring member 300 may be used in accord with the description above, for ring shaped valve member 175.

A flow/pressure regulation valve member is depicted at 310. This valve member may be used generally and analogously to the valve member 151, FIG. 3. In FIG. 5, a control spring 320 for use with the flow/pressure regulation valve member 310, in accord with spring 155, FIG. 3 is shown.

Also depicted in FIG. 5, is a valve frame piece or structural piece 330. The ring member 300 can be inserted into structural piece 330 through upper end 331.

At 332, structural piece 331 is shown with an aperture arrangement therein, through which flow can go, controlled by cut valves 333, in this case flap valves, in ring member 300.

The spring 320 and then the valve head 310 can be inserted into structural piece 330 through end 331, i.e., the end opposite end 340. At end 340, internally, a stop arrangement would be provided, to prevent the spring from passing completely through end 340.

In typical assembly, spring 320 would first be dropped through end 331, with valve head member 310 next. Disc 341 would then be positioned in place above the valve member 310. Ring 300 would then be inserted. The resulting assembly could then be mounted on a tube such as tube 66, FIG. 3, with an end 66a of the tube projecting into the opening 331, to abut ring 300 and secure the flow/pressure regulation valve assembly 47 in place.

Of course alternate specific combinations to the components to form the suction filter arrangement 10 and the sidewall arrangement 7, can be used. An example is shown in FIGS. 3A and 3B.

Figure 3A:
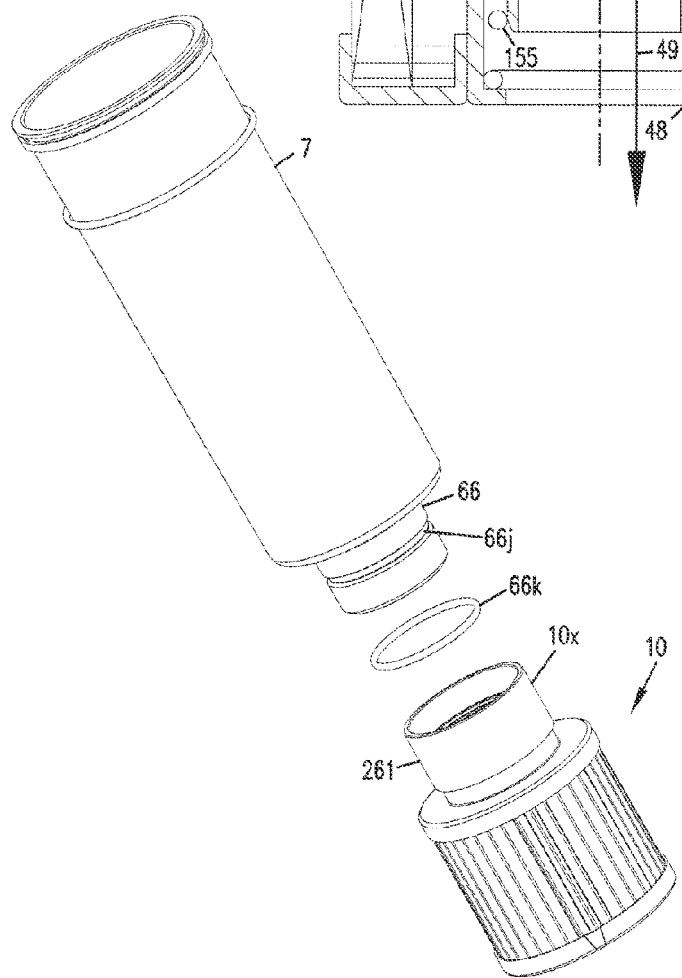
FIG. 3A is an exploded perspective view of an assembly depicting an alternative to selected features depicted in FIG. 3.

Referring to FIG. 3A, the sidewall 7, as depicted in FIG. 1B, includes an end projection 66 having an o-ring groove 66j therein, for receipt of o-ring 66k. Suction filter assembly 10 is mounted on projection 66 with o-ring 66k therethrough, projection 10x extending around projection 66, during assembly. This is shown in FIG. 3B, in the assembled form. It is noted that a threaded connection at this location, can be used, as shown in FIG. 3B at 10y. It is also noted that variations in the specifics of the suction filter arrangement 10 and the flow/regulation control assembly 47 are also possible. In connection with this, attention is directed to FIGS. 6-8.

Figure 6:
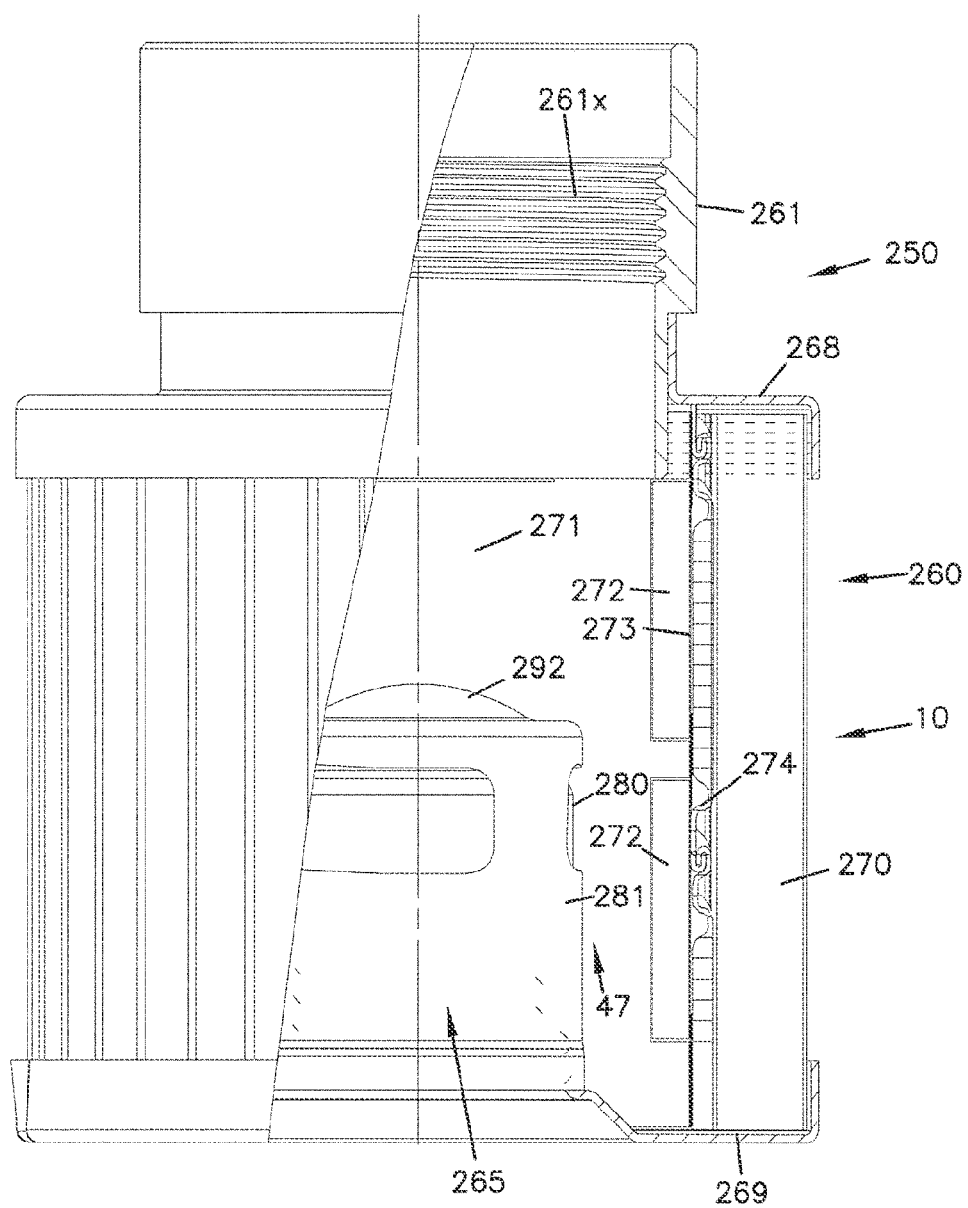
FIG. 6 is a partially cross-sectional side elevational view of a component of the assembly depicted in FIGS. 3A and 3B.

Referring to FIG. 6, subassembly 250 is depicted comprising suction filter 260 mounted on adapter 261 and, surrounding flow regulation assembly 265.

Figure 3B:
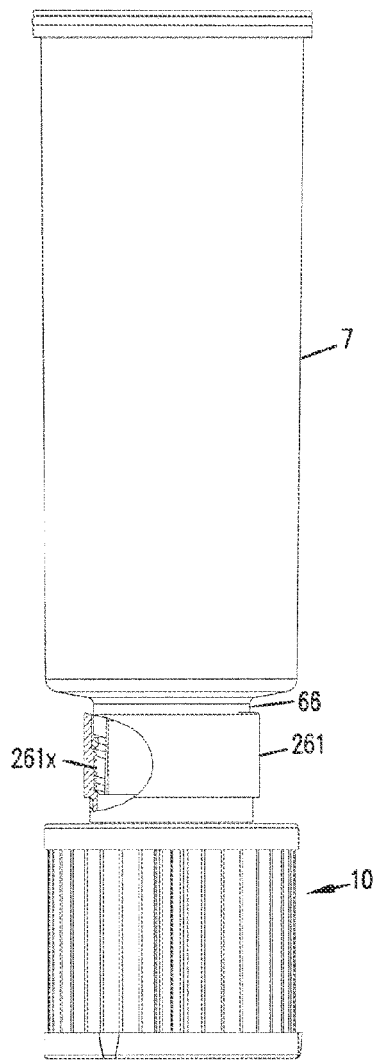
FIG. 3B is a partially cross-sectional side elevational view of the assembly of FIG. 3A.

Adapter 261 includes threads 261x thereon, for attachment to projection 66, FIGS. 3A and 3B.

Suction filter assembly 260 comprises opposite end cap 268, 269 with: suction filter media 270 extending therebetween. Internally of media 270 is positioned a non-helically spring directionally biased valve member 271, comprising two vertically spaced rows of u-shaped flap valves 272. Ring 271 is positioned inside of support 273. Support 273 is positioned inside of liner 274. Liner 274 is a media inner liner, in this instance comprising a coiled strip of metal, with edge roll seams.

End cap 269 is configured to include flow regulation valve assembly 265 therein, comprising valve head 280 positioned in valve stem 281. A spring would be positioned internally of valve stem 281 for control of valve member 280.

Functional operation of assembly 250 would be analogous to suction filter 10 described previously.

Figure 7:
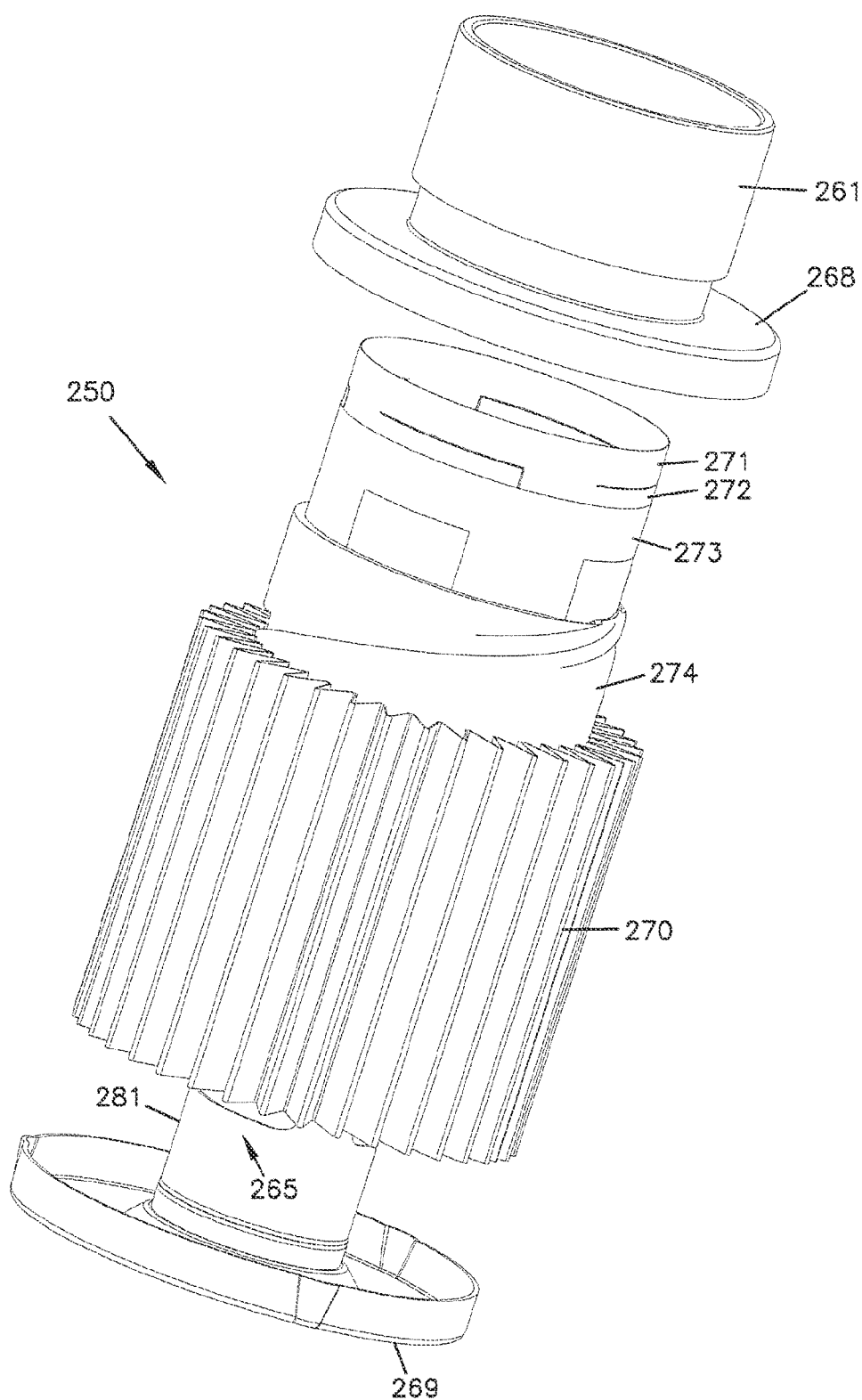
FIG. 7 is a schematic exploded perspective view of the assembly of FIG. 6.

In FIG. 7, assembly 250 is shown in exploded view, so that selected parts can be viewed.

Figure 8:
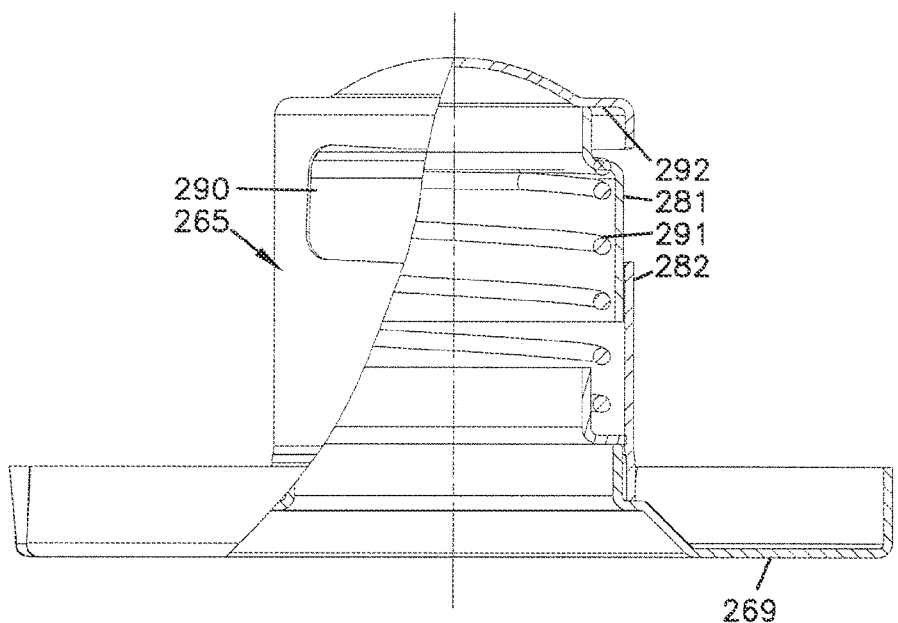
FIG. 8 is a partially cross-sectional side elevational view of a component of the assembly depicted in FIGS. 6 and 7.

In FIG. 8, end cap 269 with valve assembly 265 thereon is depicted in greater detail. It can be seen that valve piece 281 is positioned within stem 282, with apertures 290 allowing for flow. In this case, valve 281 is a tubular member, slidably positioned between spring 291 and top 292.

Attention is now directed to FIG. 2, with respect to general operation of components previously described. In FIG. 2, a schematic diagram is provided, for an understanding of the general operation. Referring to FIG. 2, a liquid tank reservoir is indicated generally at 400. At 401, an inlet line to a filter arrangement for example according to filter 1, FIG. 1, as shown. Line 401 would, for example, correspond to inlet line 30a. Line 402 generally depicts an outlet flow into a circulation system, of filtered liquid. Line 402 would generally correspond to outlet flow path 41, FIG. 1.

At 405, the primary filter arrangement having filter media is shown. This filter media would generally correspond to the filter media at 17, FIG. 1. In normal flow, then, liquid would enter from flow path 401, go through filter 405, and then, if needed, would exit through exit line 402.

Regulation flow to allow the liquid to go into the reservoir, would be controlled by flow regulation valve 410, FIG. 2. Regulation valve 410 could, for example, correspond to flow/pressure regulation valve assembly 47, FIG. 1. Thus, if the pressure in line 411 reaches an adequate limit, valve 410 would open up, allowing flow from line 401 to go directly into tank reservoir 400.

Still referring to FIG. 2, the bypass filter is indicated generally at 420. Should the pressure differential across filter 405, i.e., between regions 421 and 411 (measurable by differential pressure gauge 422) exceed an appropriately defined limit, bypass valve 421 will open, allowing flow through bypass filter 420 into region 411, from which it can be directed either into circulation via outlet line 402, or into the tank reservoir 400 through flow/pressure regulation valve 410. The filter 420 can generally correspond to bypass filter 18 and the bypass valve 421 can generally correspond to bypass valve 25, FIG. 1.

A suction valve assembly is generally indicated at 440, comprising suction filter 441 and directionally biased valve arrangement 442. Filter 441 can (if desired) generally correspond to filter 51, FIG. 3; and, directionally biased valve arrangement 442 can (if desired) generally comprise arrangement 54, FIG. 1, or the other variations described. Of course valve 442 could be positioned at region 442a if desired.

It will be understood that should there be a need for a liquid from the tank reservoir 400 into region 411, the liquid can be drawn through filter 441 and through directionally biased valve arrangement 442, into region 411. However, being directionally biased, flow from region 411 is inhibited from going through valve arrangement 442.

From the above principles, it will be apparent that the techniques and principles described herein can be applied in constructions of a variety of configurations, sizes and materials. It is an advantage that the described principles, however, can be applied in a relatively compact unit. The following ranges of dimensions are not intended to be limiting, but rather as an indication of how the principles can be applied, in preferred, compact, orientations. The dimensions refer to dimension lines found in FIG. 1. In particular, dimension G, FIG. 1, would be about 65-85 mm., typically 70-75 mm.; dimension H would typically be 25-45 mm., for example about 32 mm.; dimension I would typically be about 200-250 mm., for example about 227 mm.; dimension J would typically be about 60-80 mm., for example about 70 mm.; and dimension K would typically be about 25-50 mm., typically about 35 mm. In a particular example constructed in accord with FIG. 1, useable dimensions would be as follows: dimension G, 74 mm; dimension H, 32.3 mm; dimension I, 227 mm.; dimension J, 70 mm.; and dimension K, 35.3 mm.

Based on the above descriptions, methods of assembly will be apparent. The methods of assembly generally comprise inserting the various component parts, where indicated, into the assemblies. For example one set of steps of a method of assembly would include inserting components of a bypass valve arrangement through a lower end of a housing and into an interior of a stand pipe, as shown. In general, in the arrangement shown in FIG. 1, the steps would comprise inserting a ring 106a, inserting a spring 105 and then inserting a valve slide 101, followed by closure with a cover 113.

Another method of assembly would include assembling a suction filter arrangement 10 including both a first non-helical coiled spring, directionally biased valve arrangement and a flow/pressure regulation valve arrangement, as shown. One method of assembly was described, in connection with FIG. 5. The particular order of insertion of componentry can be directed, by controlling the shape and size of various components.

Also according to the present disclosure, preferred serviceable filter cartridge arrangement is described. The filter cartridge arrangement includes a first primary filter cartridge section and a second bypass filter cartridge section. The two are joined at a first end cap. The first end cap also preferably includes a seal therein for sealing to a frame piece, such as stand pipe during insertion. For the example shown, FIG. 1, the seal is on an inside of the first end cap. A second end cap is provided at an opposite end of the primary filter cartridge section, from the first end cap. For the examples shown, FIGS. 1 and 9, the second end cap preferably includes a seal mount thereon defining a seal plane extending at a selected angle non-orthogonal to a central axis of the primary filter cartridge section, although alternatives are possible. Preferably the selected, acute, non-orthogonal angle is within the range of 30°-60°, inclusive. Such an arrangement can easily be accommodated, by molded structural portions of the end cap defining an outer o-ring seal group.

Although alternatives are possible, the filter cartridge preferably includes an upper projection (or yoke) on an opposite side of the second end cap, from the side from which the media of the primary filter cartridge extends. This projection preferably allows for flow through an opening in the second end cap, while at the same time providing a stop to insertion of a projection from a top of the housing.

The second end cap also preferably includes a shield arrangement circumscribing a portion of the filter media of the primary filter cartridge section. The shield section generally extends along an outside of the primary filter cartridge section a length equal to or greater than a diameter of an inlet port or outlet port in a corresponding housing, during use.

In some instances, the bypass filter arrangement can include a third end cap having a contaminant collection projection extending outwardly therefrom.

A method of servicing is provided, which preferably involves steps of opening a top cover of a housing, removing a filter cartridge 15 according to the general descriptions herein, and replacing it with a new, or refurbished, filter cartridge arrangement.

Methods of use of the assembly were described, in connection with FIG. 2. They generally provide for allowing for flow into and out of a reservoir, under the control provided, as well as a circulating flow, with filtering as described.

As described above, the principles of construction and operation with respect to the arrangement described in connection with FIGS. 1-9, can be applied in a variety of arrangements. They are particularly configured for use in arrangements with an expected flow into the inlet arrangement 130 and out of the outlet arrangement 131 on the order of up to about 120 liters per minute, for hydraulic systems.

In association with FIGS. 10-26 below, an arrangement that utilizes many of the same principles described is provided, for systems in which a higher flow rate, as described, is expected.

II. A Second Embodiment; FIGS. 10-29

The principles described generally above, can be applied in arrangements having alternate specific features, and configured for still further applications. In FIGS. 10-29 such an arrangement is depicted, for application in hydraulic systems with expected flow rates, for example, of up to about 250 liters per minute. Of course the principles could be applied, to construct arrangements to allow for alternate flow rates, if desired.

As will be apparent from the following descriptions, many of the features depicted have analogous functions and operate analogously to features described previously, in connection with FIGS. 1-9.

Figure 10:
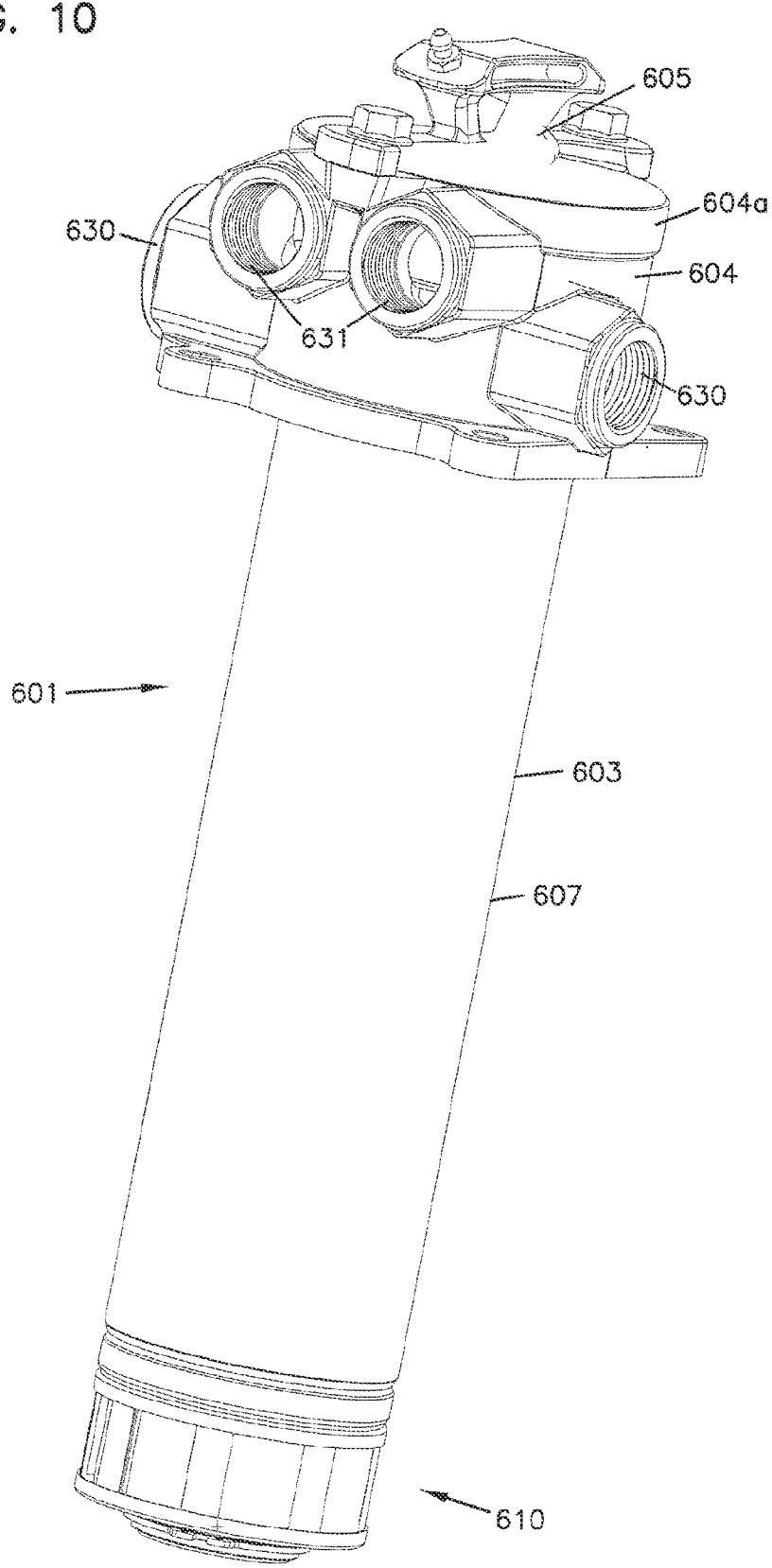
FIG. 10 is a side perspective view of an alternate filter assembly according to the present disclosure.

The reference numeral 601 FIG. 10 generally indicates a liquid filter arrangement or assembly according to this aspect of the present disclosure. The liquid filter assembly 601 includes a housing 603 comprising a filter head 604 having a body 604a and a removable top or cover 605; and, a side wall 607, which in use depends from filter head 604. In general, the housing 603 defines an internal volume 608, FIGS. 11 and 12, in which: selected internal componentry as defined is contained; and, certain filtering and flow operations occur. The liquid filter assembly 601 further includes a suction filter assembly 610.

The liquid filter assembly 601 includes, operably positioned therein, a serviceable filter cartridge arrangement 615, FIGS. 11, 12, 19 and 20. For the particular, preferred, liquid filter arrangement 601 shown, the serviceable filter cartridge 615, FIGS. 19 and 20, optionally includes two filter sections or components namely: a primary filter cartridge or cartridge section 617; and, a bypass filter cartridge or cartridge section 618. The primary filter cartridge section 617 and bypass filter cartridge section 618 can be secured to one another, and be removed and serviced as an integral unit.

Of course, the primary filter cartridge or cartridge section 617 is not required to be integrally (non-separably) attached to the bypass filter cartridge or cartridge section 618. However, the arrangement depicted, in which the two are permanently secured to one another (or are integral), is convenient and typical.

The preferred serviceable filter cartridge assembly 615, FIG. 20, further includes, as described below, an end cap and seal arrangement 620, which provides for a preferred mounting and sealing of the serviceable filter cartridge arrangement 615, within the liquid filter arrangement 601.

Figure 11:
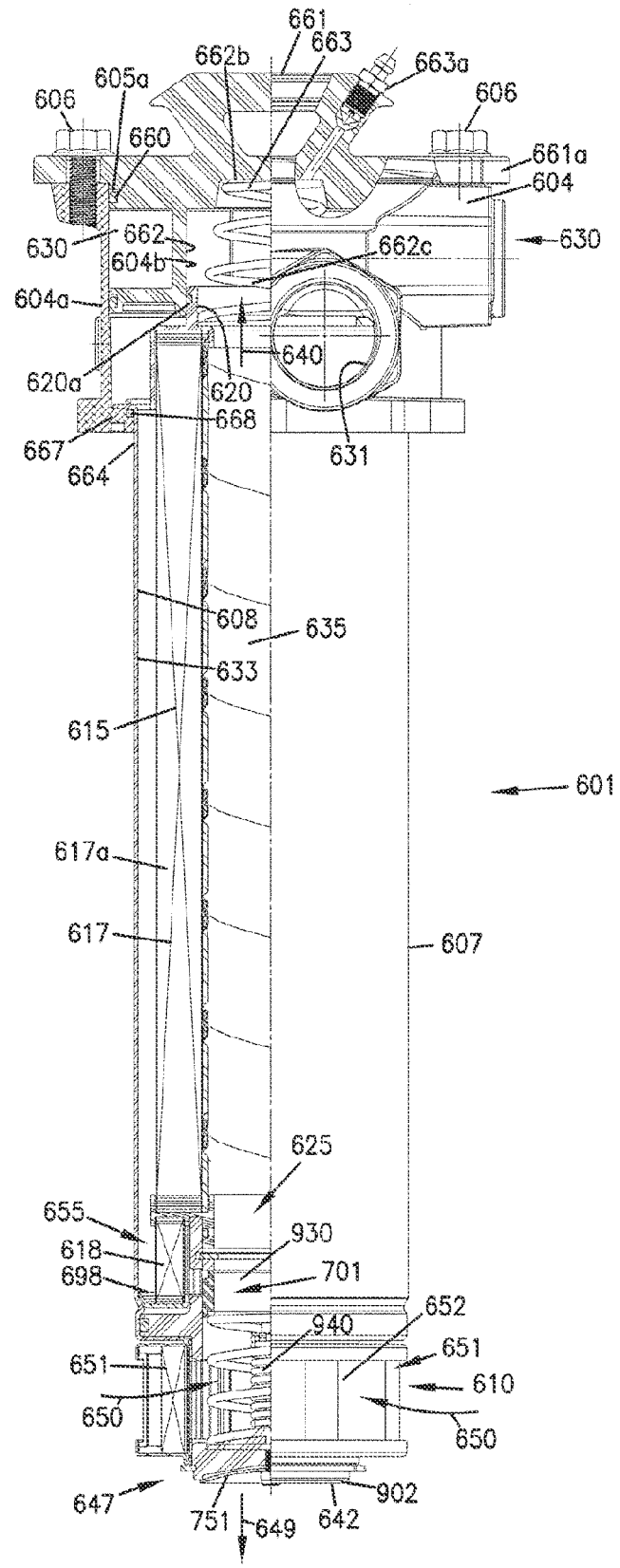
FIG. 11 is a partially cross-sectional side view of the assembly depicted in FIG. 10.
Figure 12:
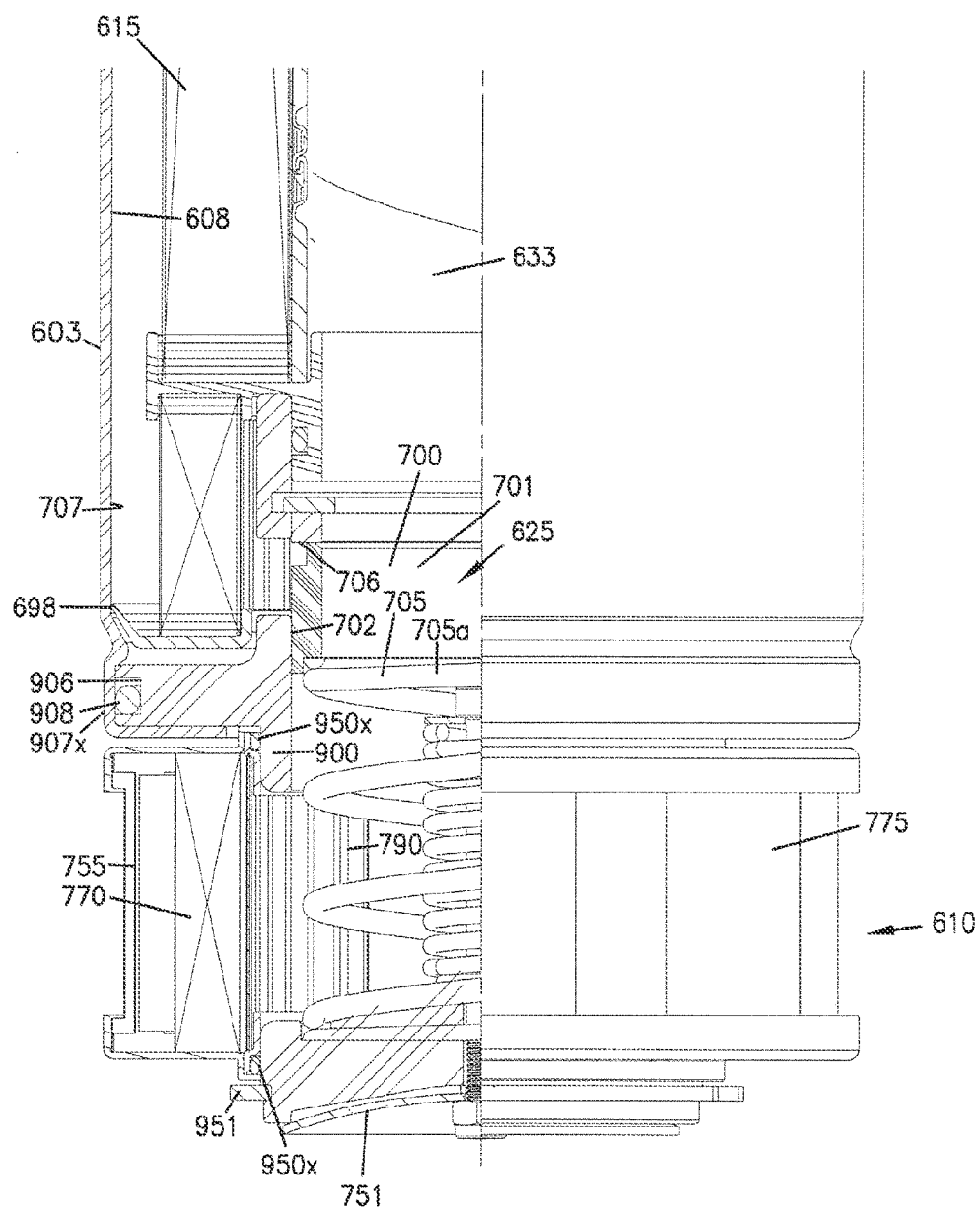
FIG. 12 is an enlarged fragmentary view of the assembly depicted in FIG. 11.

The preferred liquid filter assembly 601 depicted includes a bypass valve assembly 625, FIGS. 11 and 12.

Referring to FIGS. 10 and 11, typical operation of the various components defined, will be generally in accord with the description above, for assembly 1, FIG. 1. The filter head 604 generally includes a body 604a having an inlet or inlet arrangement 630 and an outlet or outlet arrangement 631. Again, the liquid flow inlet arrangement 630 will sometimes be referred to as a circulation loop liquid flow inlet arrangement, since it is an inlet to the filter head 604 of liquid from a circulation loop in which the liquid circulates to perform its function. Similarly the outlet arrangement 631 will sometimes be referred to as a circulation loop liquid flow outlet arrangement, since it is an outlet for filtered liquid, from the filter head 604 and thus the assembly 601, for the liquid to be directed into a circulation loop to perform its function. As for FIG. 1, in both instances, the terms are meant to distinguish an inlet/outlet arrangement, discussed below, referenced as the reservoir inlet/outlet, which provides for liquid flow from the assembly 1 directly into a liquid reservoir.

Figure 16:
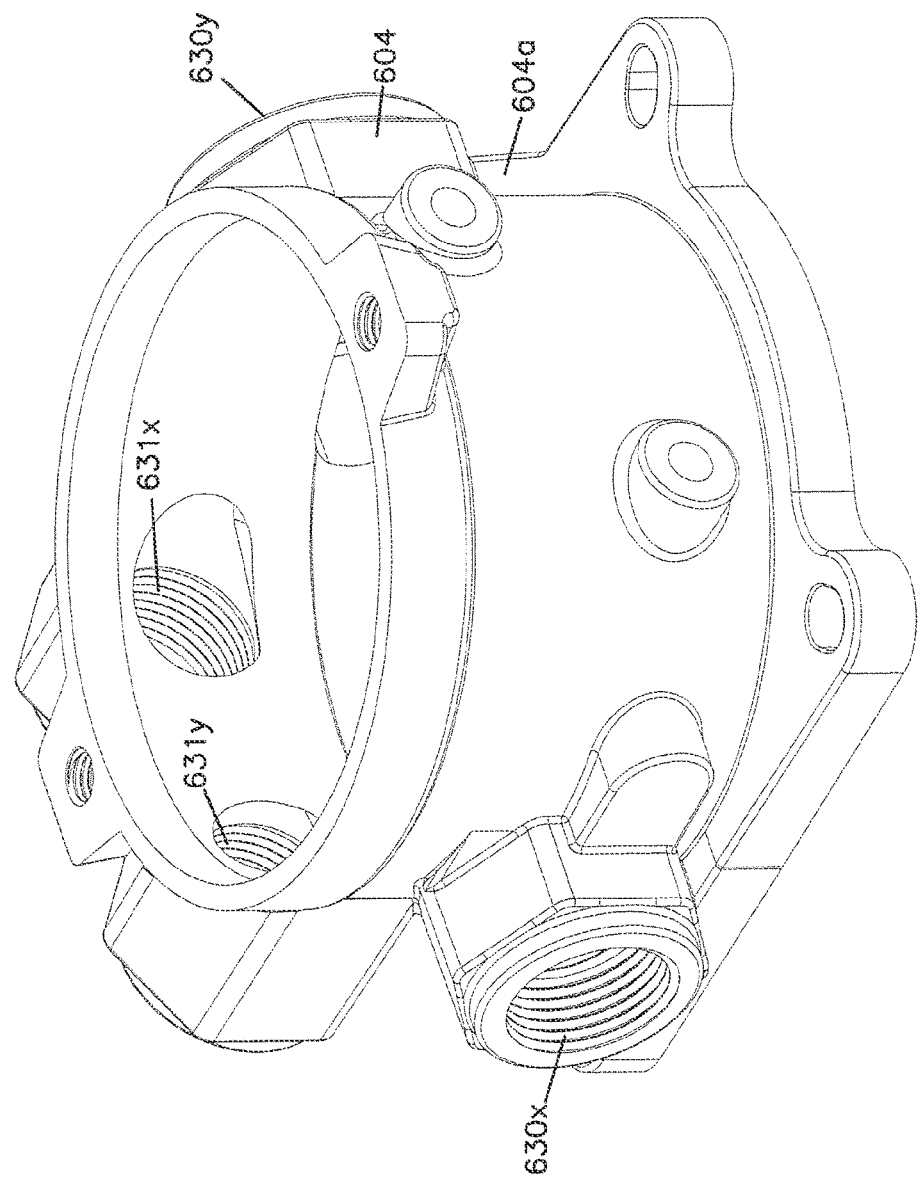
FIG. 16 is a perspective view of a filter head component of the assembly depicted in FIG. 10.

Referring to FIG. 16, for the particular assembly shown, the filter head 604 includes, for the inlet arrangement 630, two inlets 630x and 630y; and for the outlet arrangement 631, two outlets 631x and 631y. This allows assembly 601 to be operated with two circulation loops, for filter liquid. The assembly 601 is to be used with only a single circulation loop, since one of inlet 630x, 630y and one of outlet 631x and 631y can optionally be closed or capped.

Referring to FIG. 11, liquid to be filtered is directed into inlet arrangement 630. The unfiltered liquid then flows into annular unfiltered liquid volume 633, around the serviceable filter cartridge assembly 615. In general, volume 633 is an "unfiltered liquid volume," since the liquid received therein, will generally be received directly from a circulation loop, and will be unfiltered and will require filtering.

In normal operation, from the unfiltered liquid volume 633, the liquid is passed through the primary filter cartridge 617 to its interior 635. (This would be a filtering flow.) From the central volume 635 the liquid can pass out of the filter cartridge 615 in a direction of arrow 640 to outlet arrangement 631, and outwardly from the assembly 601. (The flow from volume 635 through outlet arrangement 631 is a non-filtering flow.)

To address the event that liquid flow demands in the circulation loop downstream of the assembly 601, i.e., in the direction of arrow 640, are not sufficiently great to require all filtered liquid entering region 635 to be directed into the circulation loop by passage (after filtering) through outlet arrangement 631, as with arrangement 1, FIG. 1, an alternate flow direction is provided. In particular, flow from central volume 635 can be directed outwardly from the housing side wall 603, and eventually outwardly from the assembly 601 and into a tank reservoir, by passage through reservoir outlet/inlet (or inlet/outlet) 642.

Although alternatives are possible, it is noted that assembly 601, FIG. 11, does not include a central standpipe analogous to standpipe 45, positioned in and secured to sidewall 607. A structure 900 which replaces standpipe 45, with respect to certain functions, is discussed in more detail below.

As with arrangement 1, FIG. 1, in a typical operation, a flow path indicated by arrow 649, from region 635, would be a liquid flow exit from assembly 601 into a tank reservoir, not shown in FIG. 11. In typical use, although alternatives are possible, the liquid filter assembly 601 would be an in-tank assembly in accord with the principles described herein and would be mounted on a reservoir tank with suction filter assembly 610 submerged in the reservoir.

With the particular, preferred, liquid filter assembly 601 depicted, flow/pressure regulation valve arrangement 647 is conveniently positioned on the suction filter assembly 610, as described in detail below, although alternatives are possible.

As with arrangement 1, FIG. 1, from the above descriptions, it can also be expected that in some circumstances, for assembly 601, there may be a flow demand increase downstream of the liquid filter arrangement 601, relative to the liquid volume and flow going into inlet arrangement 630. When this occurs, liquid will be drawn from the tank reservoir in the directions of arrows 650, FIG. 11, eventually into central volume 635. Such a flow will generally be through suction filter 651, in suction filter arrangement 610, and is a filtering flow. A directionally biased flow arrangement 652, preferably as described in detail below, is provided in the suction flow path. The directionally biased flow arrangement 652 allows for entrance of liquid into region 635, but inhibits liquid flow in an opposite direction, so as not to override or disable a proper bypass operation of flow/pressure regulation valve arrangement 647. The preferred directionally biased flow arrangement 652 depicted, is a non-helical spring valve arrangement 652a, discussed below. It is noted that for the embodiment depicted in FIG. 11, the non-helical spring valve arrangement 652 surrounds the filter 651, although alternatives are possible.

To protect the equipment in the circulation loop, in circumstances in which the primary filter cartridge section 617 becomes occluded to an undesirable level, a bypass filter arrangement 655, FIG. 11, is provided. The bypass filter arrangement 655 includes bypass filter 618 and bypass control valve arrangement 625. In general, should the pressure differential across media 617a in primary filter cartridge 617 become sufficiently high, the bypass control valve 625 is configured to open, to allow liquid flow through bypass filter 618 and into central volume 635, as a filtering flow but without passage through filter media 617a in primary filter cartridge 617. As with assembly 1, FIG. 1, this flow can then proceed, in the direction of arrow 640, FIG. 11, through outlet arrangement 631, or into the reservoir by passage through reservoir inlet/outlet 642 and from assembly 601 via the pathway of arrow 649.

The bypass filter arrangement 655 is discussed further below, in connection with FIG. 12.

Figure 14:
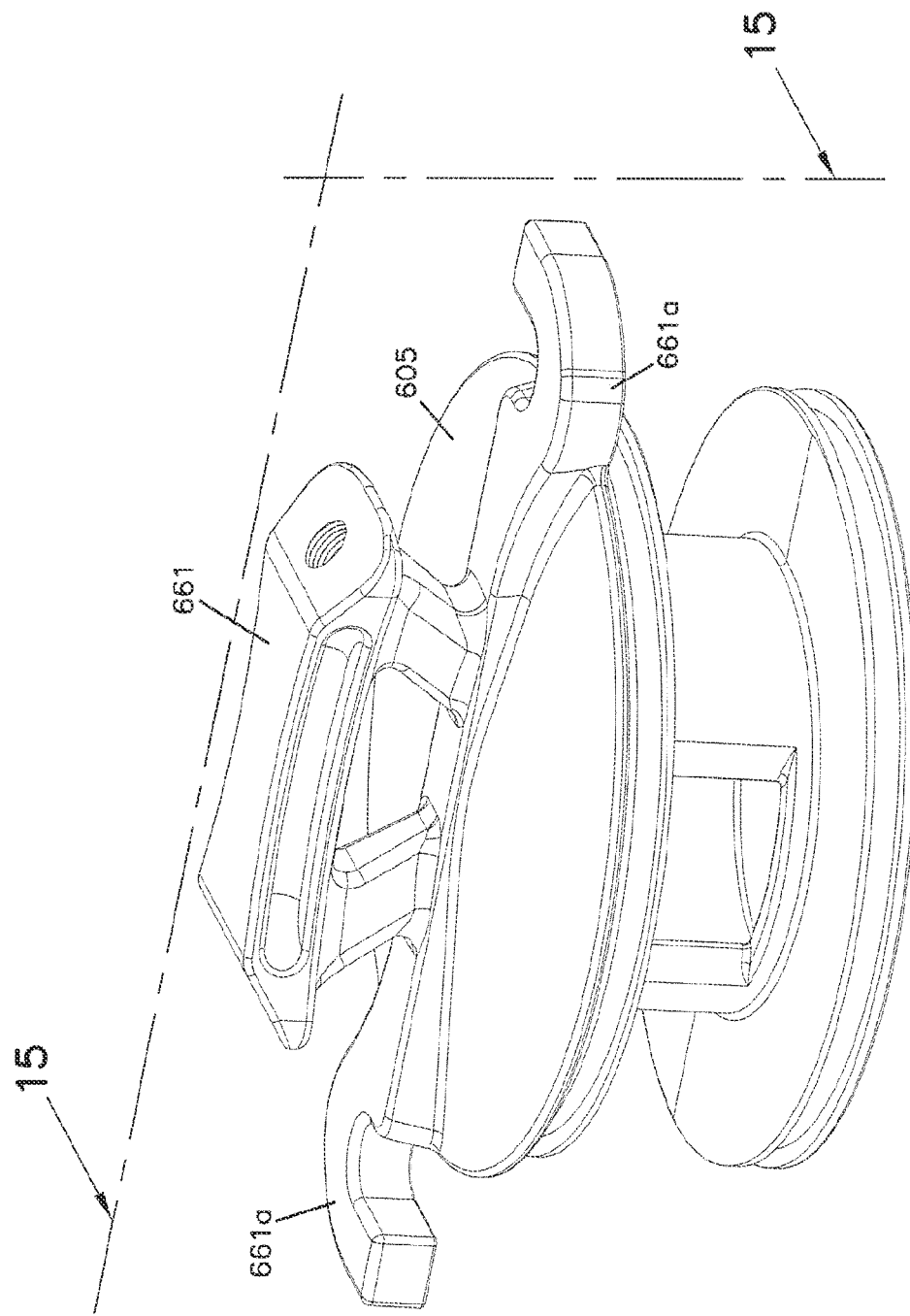
FIG. 14 is a perspective view of a cover piece for the assembly of FIG. 10.
Figure 15:
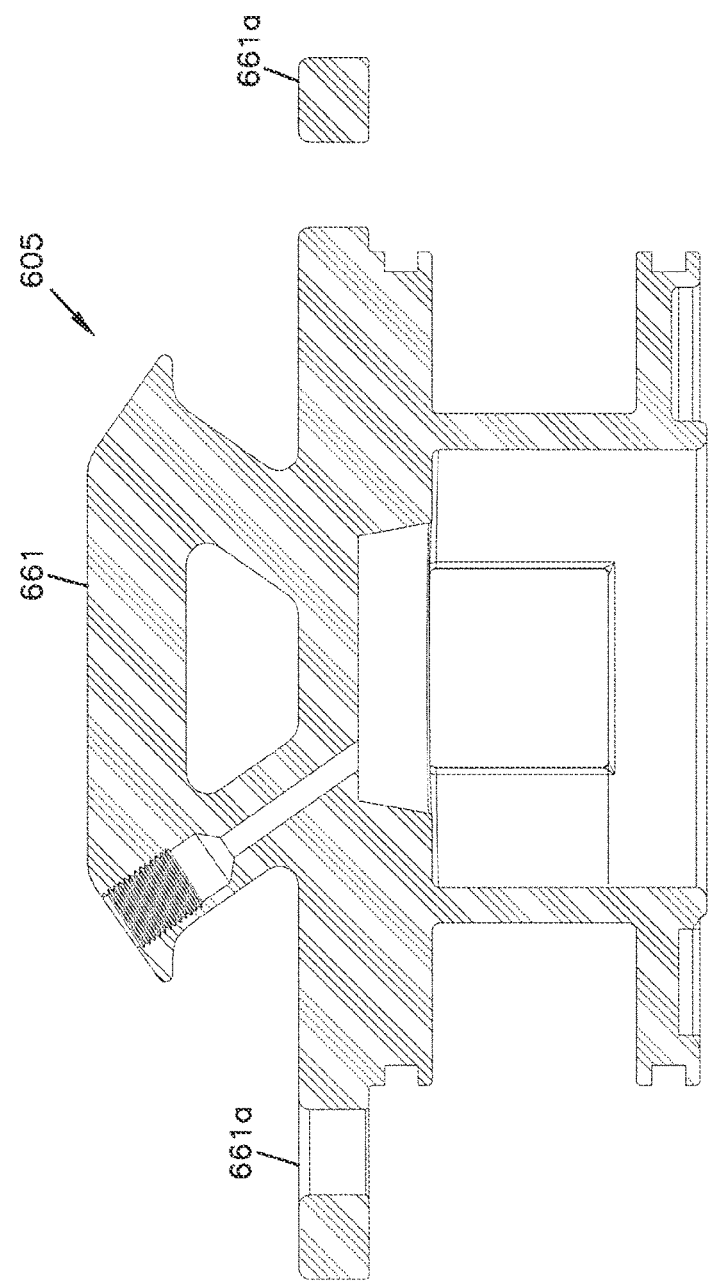
FIG. 15 is a side cross-sectional view of the cover piece depicted in FIG. 14, taken along line 15-15.

For a typical liquid filter assembly 601, filter head 604 will be a cast member, for example made from cast aluminum or other material. Cover 605 is secured by bolts 606, FIG. 11, to the filter head 604, to close service aperture 605a, with a seal provided by o-ring 660. The cover 605 includes handle 661 and extensions 661a, for bolts 606. An optional bleed valve assembly can be located at 663a. In FIGS. 14 and 15, cover 605 is shown in greater detail, but without bolts 606.

The cover 605 includes positioned internally and centrally, a stem 662, configured to project into a central volume 604b of filter head 604. The filter cartridge 615 is sealed to stem 662 by seal 620a on stem 620. In particular, stem 620, on cartridge 615, projects inside of stem 662, on cover 605.

In use, spring 663 is positioned inside the stem 662, FIG. 11, to ensure that the serviceable filter cartridge 615 is retained in extension into the housing 603, at an appropriate position and to ensure that the cartridge 615 cannot be moved out of its operational (sealed) position, unless cover 605 is removed. For the arrangement 601 shown, spring 663 is conically shaped, with narrow end 662b and wide end 662c.

Analogously to arrangement 1, FIG. 1, the sidewall portion 607 of the liquid filter assembly 601 depicted, FIG. 10, is separable from the filter head 604. In particular, the body 604a of filter head 604, FIG. 11, includes an aperture 664 therein positioned on opposite side or direction of the filter head body 604a from the service aperture 605a and cover 605. The sidewall section 607, projects through, and outwardly from (in use downwardly from), the aperture 663.

Figure 17:
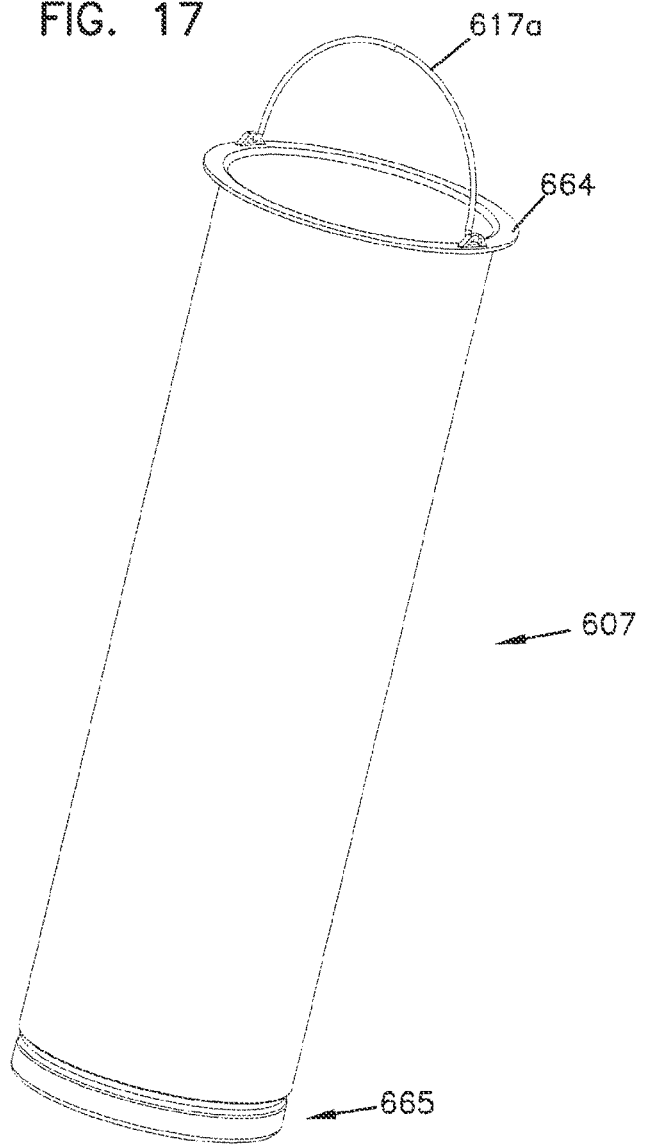
FIG. 17 is a perspective view of a sidewall component useable in the assembly of FIG. 10.
Figure 18:
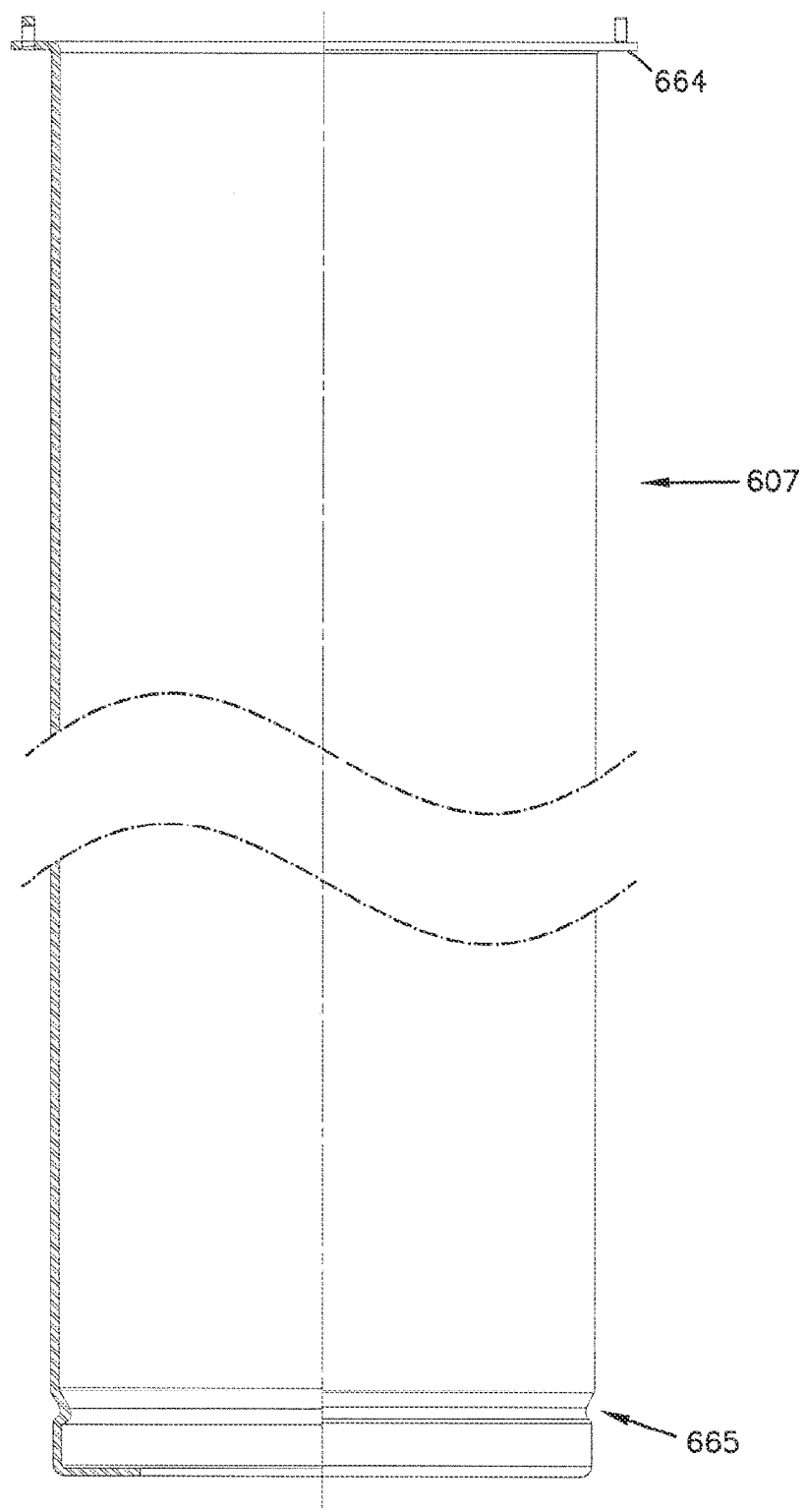
FIG. 18 is a partially cross-sectional side view of the sidewall component of FIG. 17, shown without a handle mounted thereon.

The sidewall section 607, is depicted in FIGS. 17 and 18. In FIG. 17, the sidewall section 607 is shown with wire handle 617a, which can be rotated down. In FIG. 18, the sidewall section 607 is shown without the handle. The sidewall section 607 has shoulder 664 (at an upper end in use) and an opposite (in use bottom) end 665. The side wall 607 is sized such that, during assembly, when the top 605 is removed from body 604a, FIG. 11, the side wall 607 can be lowered into the housing 603 through the opening 605a provided by the absence of the cover 605, until the shoulder 664 engages shoulder 667 in the filter head 604. Shoulder 664, FIG. 11, is provided with a seal member 668, to provide for a seal at this location.

Figure 19:
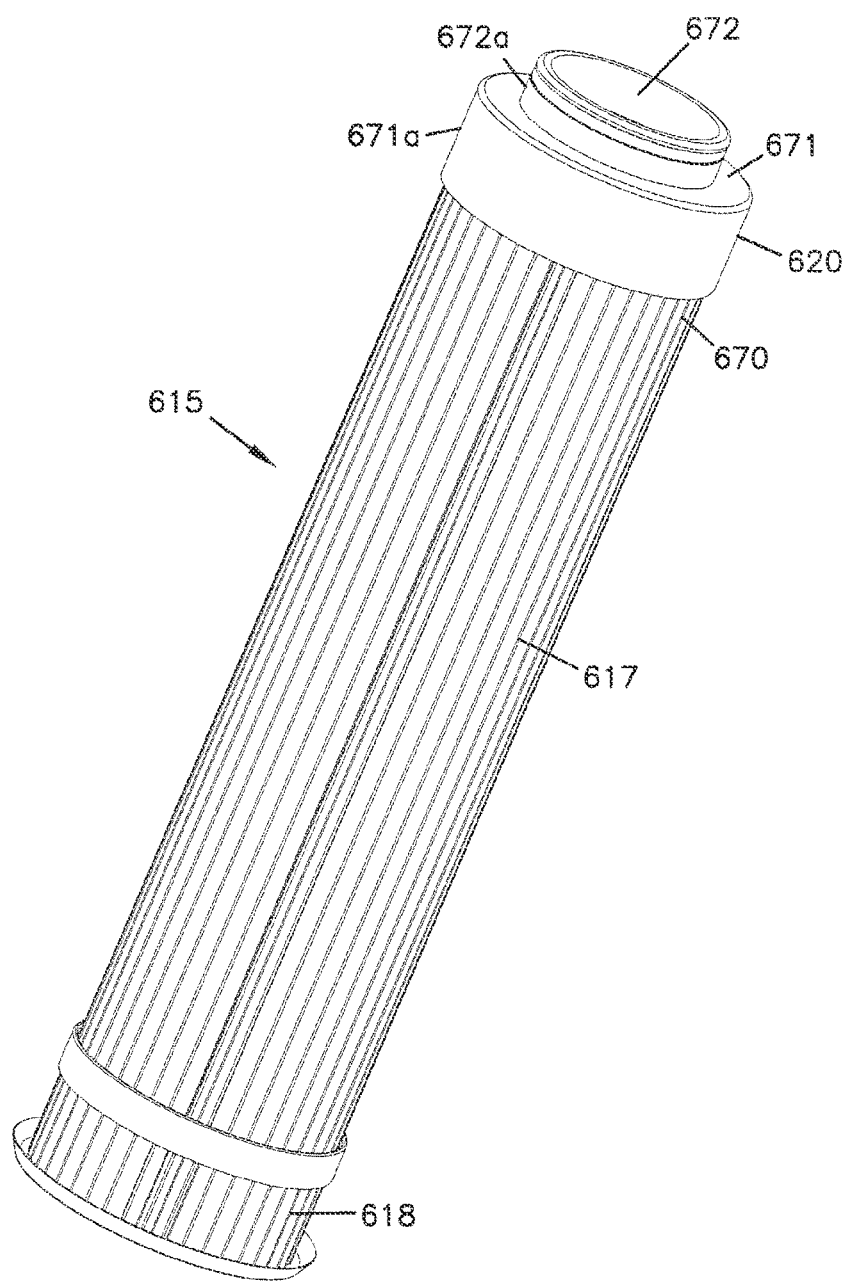
FIG. 19 is a perspective view of a replacement part filter cartridge useable in the assembly of FIG. 10.
Figure 20:
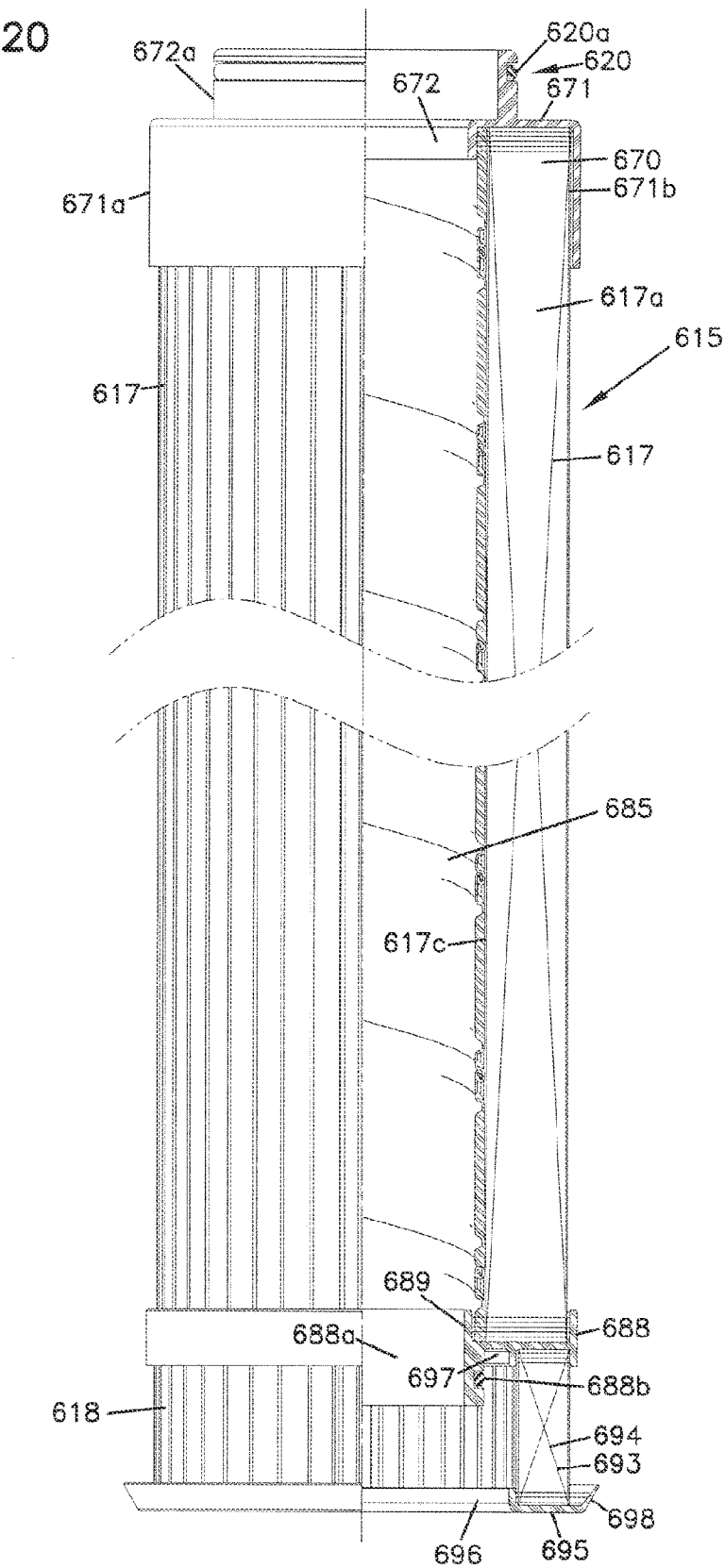
FIG. 20 is an enlarged partially cross-sectional side elevational view of the replacement part filter cartridge of FIG. 19.

Attention is now directed to the serviceable filter cartridge 615, FIGS. 19 and 20. In general the serviceable filter cartridge 615 includes the second (upper in use) end cap and seal arrangement 620, referenced above. The end cap and seal arrangement 620, for the particular embodiment depicted, are mounted on an end (in use upper end 670) of the primary filter cartridge 617. The end cap and seal arrangement 620 include an end cap portion 671 which, for example, can be a molded member secured (i.e., potted) to the primary filter cartridge 617. The end cap portion 671 includes a central aperture 672, for passage therethrough of liquid (from region 635) to be directed in the direction of arrow 640 to circulation loop outlet arrangement 631. The end cap portion 671 includes axial projection 672a. The projection 672a is tubular with an outer surface and projects in an opposite direction (from end cap portion 671), from primary cartridge media 617a. The projection 672a is configured to project into projection 662, FIG. 11, with sealing by o-ring 620a, as previously mentioned. The o-ring or seal, then, is mounted on an outside surface of, and surrounds, projection 672a.

The end cap 671 can be molded from a variety of moldable plastic materials, for example a polyamide (PA). As an example, a glass filled polyamide (15-30% glass filled by wt.) is useable. It can also be formed as a metal piece.

Referring to FIG. 20, it is noted that end cap 671 includes a shield projection 671a thereon. The shield projection 671a projects downwardly along an outside 617b of media 617a in cartridge 617 generally a length of extension far enough to extend to a point at or below a lower most extent of inlet arrangement 630 and outlet arrangement 631. This will inhibit fluid entering inlet arrangement 630 from directly impinging upon the media 617a at this location.

A central support or inner support 685 may be positioned along an inside 617*c* of the pleated media 617, for support. A perforated metal liner, or expanded metal liner, can be used, for the inner support 685. If a metal-free or reduced metal configuration is desired for the serviceable cartridge 615, an extruded, perforated or porous liner can be used. In FIG. 20, a preferred coiled strip with an edge coupling used for liner 685.

The media may be contained within a mesh or similar structure, if desired. The mesh may comprise a metal wire mesh or a plastic mesh, as preferred.

In some assemblies it may be desirable to provide the primary filter cartridge 617 with an upstream outer liner, or a liner/valve construction, in accord with the descriptions of the PCT Application No. PCT/US03/19112, filed Jun. 18, 2003, entitled "ARRANGEMENT FOR CONTAINING FILTER CONTAMINANT; ASSEMBLY; AND METHODS," identifying Johan Fobe, Enrico Greco and Julien Dils as inventors and having a priority claim to U.S. Ser. No. 60/390,856 filed Jun. 21, 2002 and published as PCT WO 04/000436 on Dec. 31, 2003; hereinafter "the WO/04/000436 publication;" incorporated herein by reference.

Referring still to FIG. 20, at an end opposite end cap 671, the primary filter media 617 is secured to end cap 688. End cap 688 is open, having a central aperture 689. The end cap 688 includes tubular axial projection 688*a* projecting axially away from media 617*a*, with an outer surface having a seal 698*b* (in this instance an o-ring) extending peripherally therearound.

For the particular embodiment depicted in FIG. 20, the inner seal 688*b* is a radially directed seal, or radial seal. The particular seal 688*b* depicted is an outwardly directed seal, when defined with respect to the sealing force from end cap 688, to which it is attached. Seal 688*b* provides a seal to another component, discussed below. Seal 688*b* is surrounded by, and spaced from, the bypass filter media, as discussed below.

Referring to FIG. 20, attention is now directed to the bypass filter 618. The bypass filter 618 comprises a filter media 694 positioned in extension between opposite end caps 688 and 695. End cap 688, which forms an upper end cap (when operably installed) for the bypass filter 618, comprises a lower end cap (when operably installed) for the primary filter media 617*a*, for the embodiment shown. Preferably both the primary filter cartridge media section 617*a* and the bypass filter cartridge section 618 are non-removably secured to the end cap 688. Typically the bypass filter cartridge section 618 and the primary filter cartridge media section 617*a* would be secured to the end cap 688 by being potted in the material of the end cap 688.

End cap 695 is an open end cap, having open central aperture 696. For a typical bypass arrangement, the media 694 would comprise a plastic or wire screen 693, or similar construction. Generally the media 694 is not intended for long term filtering flow operation, but only to ensure the equipment is appropriately protected during a period in which the primary filter media section 617 has become occluded to an extent that a bypass flow in operation is needed.

Still referring to FIG. 20, it is noted that a portion of media 694 is positioned to surround projection 688*a*, with seal 688*b*, spaced therefrom by gap 697. Thus, projection 688*a* extends into an open interior of the bypass filter arrangement 618. Gap 697 is a receiving gap or channel, for a tubular part of a structural member as described below.

As with arrangement 1, FIG. 1, in a typical application, the axial length of the media 617*a* of the primary filter media section 617, i.e., the length in the direction of axis 678, will be at least 3 times (typically at least 4 times) the axial length of the bypass filter media 694 section 618.

Lower end cap 695 is provided with an optional outwardly directed lip 698, positioned such that, when serviceable filter cartridge 615 is drawn upwardly through housing 603. The lip 698 can catch sediment in annular volume 633, FIG. 11, for removal from assembly 601.

From the previous descriptions, and a review of FIG. 11, it can be seen that during a servicing operation, cover 605 would be removed, and the serviceable filter cartridge 615, comprising the primary filter cartridge 617 and the bypass filter 618, would be operably installed and cover 605 would be positioned in place.

Proper operation of the bypass filter 618, is controlled by the bypass valve assembly 625. Referring to FIG. 12, the bypass valve assembly 625 comprises a valve member 700, in this instance a tubular valve member 701 slidably positioned within seat 702 between biasing member 705 (in this instance spring 705*a*) and stop 706. Sufficient fluid pressure against region 707 will cause the bypass valve 625 to open. In this example, the valve member 700 and spring 705*a* are mounted within internal valve frame piece 900. The valve frame piece 900 includes and defines seat 702.

The valve frame piece 900, mounted on housing 603, supports: bypass valve assembly 625; suction filter assembly 610; and, flow regulation control assembly 647.

Figure 23:
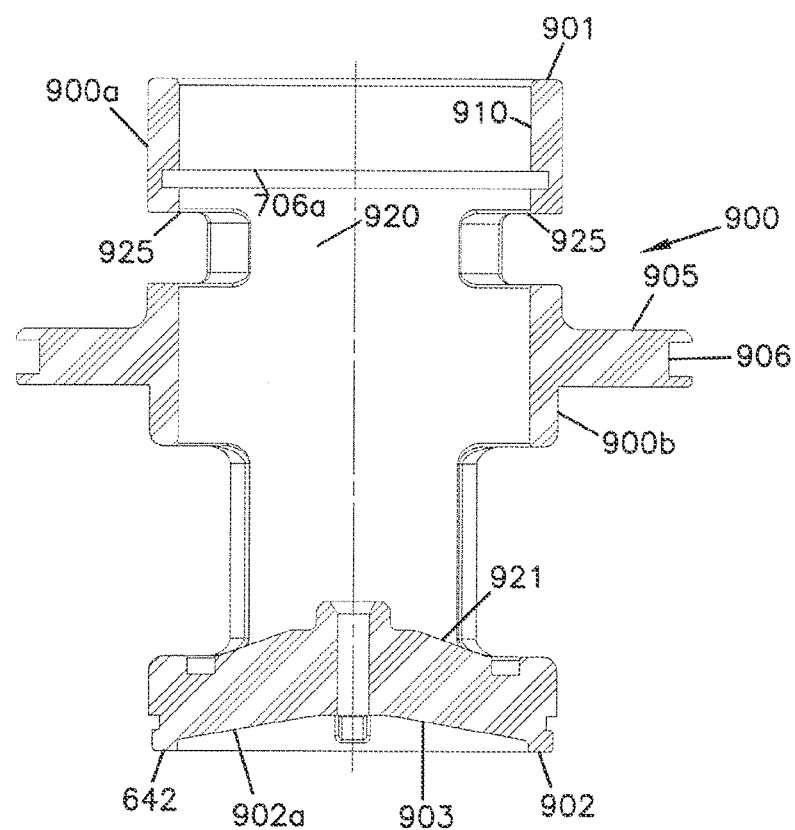
FIG. 23 is a cross-sectional view of the component depicted in FIG. 21.

Attention is directed to FIGS. 21-23, with respect to valve frame piece 900. In FIG. 21, valve frame piece 900 is depicted in an orientation similar to that it would have, when installed on the housing 603 of the arrangement 601 of FIG. 11. In FIG. 23, piece 900 is depicted in cross-sectional view, with a similar orientation. In FIG. 22, frame piece 900 is viewed inverted, relative to FIGS. 21 and 23.

As indicated, the valve frame piece 900 is involved in a number of operations. In this next portion of the description, detail will be provided with respect to:

1. How internal structural piece 900 is secured to and sealed within housing sidewall 607;

2. How internal structural piece 900 is sealed to filter cartridge 615; and, 3. How internal frame piece 900, in conjunction with the biasing member 705 and valve member 700 forms the bypass valve assembly 625.

Referring first to FIG. 21, frame piece 900 is tubular and has opposite open ends 901, 902. At end 902 internal cross framework 903, discussed below, is provided.

Spaced between ends 901 and 902, is provided a radial ring defining peripheral seal support member 905, with an outer annular, peripheral, seal groove 906 therein. When valve frame piece 900 is mounted within sidewall 607, an o-ring 908, FIG. 12, is typically positioned within groove 906, for sealing against lower sidewall section 607*x*. In a typical construction, the sidewall 607 would be pinched around projection 905, to secure frame piece 900 in position.

Seal support member 905 generally separates the frame piece 900 into two sections, 900*a* and 900*b*. Referring to FIG. 11, portion 900*a* generally projects axially into an interior of side wall 607, when mounted, and section 900*b* generally projects axially outwardly from side wall 607, when mounted.

Referring again to FIG. 21, immediately adjacent end 901, section 900*a* of valve frame piece 900 defines outer seal surface 910. The seal surface 910 is sized and configured to be received within lip or slot 697, FIG. 20, on end cap 688 during use; sealing between valve frame piece 900 and end cap 688 being provided by o-ring 688*b*, FIG. 20. Sidewall portion 911, FIG. 21, then, is sized to be positioned between projection 688a and bypass filter media 694, during installation. Again, sealing is preferably along inside surface 910, although alternate configurations are possible.

Referring to FIG. 23, interior volume 920 of internal frame piece 900, is sized for receipt of components of the bypass valve assembly 625 therein, in particular valve member 701 and biasing member 705a. The biasing member or spring 705a would be seated at seat 921, FIG. 23, and it would extend upwardly. The valve member 701 would be slideably received between the spring 705 and stop or seat 706, FIG. 12. The stop 706 would comprise a snap ring positioned in groove 706a, FIG. 23, after insertion of the spring 705 and slide member 701 through end 901 during assembly.

Bypass valve aperture arrangement 925, in side wall section 900a, provides for a communicating flow between volume 635 and volume 633, FIG. 12, for pressure to be applied against tubular valve member 701. When this pressure differential between regions 633 and 635 exceeds a defined amount, the biasing force of spring 705a is overcome, tubular valve member 701 slides away from seat 702, and aperture arrangement 925 is opened so that a bypass flow can go from region 633, FIG. 12, into open region or interior 930 of internal frame piece 900. From here the liquid can, depending on circumstances, flow to the outlet arrangement 631, or through end 642, FIG. 11, to the tank.

Assembly 601, analogously to assembly 1, includes a flow/pressure regulation valve assembly. In the instance of assembly 601, the flow/pressure regulation valve assembly is indicated at 647, FIG. 11, and controls flow through end 642. Referring to FIG. 12, end 642 is end 902 of section 900b (FIG. 23) of valve frame piece 900.

In operation, FIG. 11, flow through end 648 is inhibited by disk-shaped valve member 751, until pressure in region 930 exceeds the control pressure of spring 940. At this point, the valve member 751 will move to open aperture arrangement 902a at 902 to liquid flow therefrom, and into the tank. That is, under the appropriate pressure conditions within region 930, liquid flow can go through end 642, FIG. 11, to the tank. This will be understood in further detail by reference to FIGS. 27 and 28.

Figure 27:
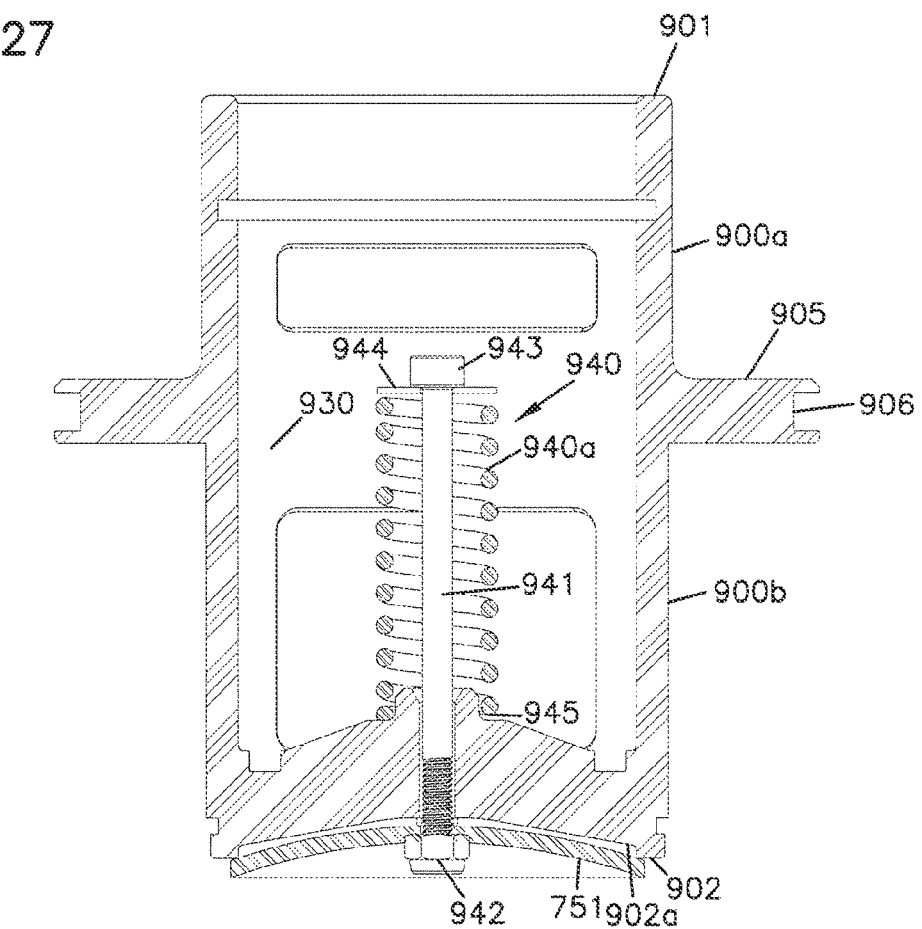
FIG. 27 is a cross-sectional view of the frame piece depicted in FIGS. 21-23, shown with valve member 751 mounted thereon and depicted in a closed position.
Figure 28:
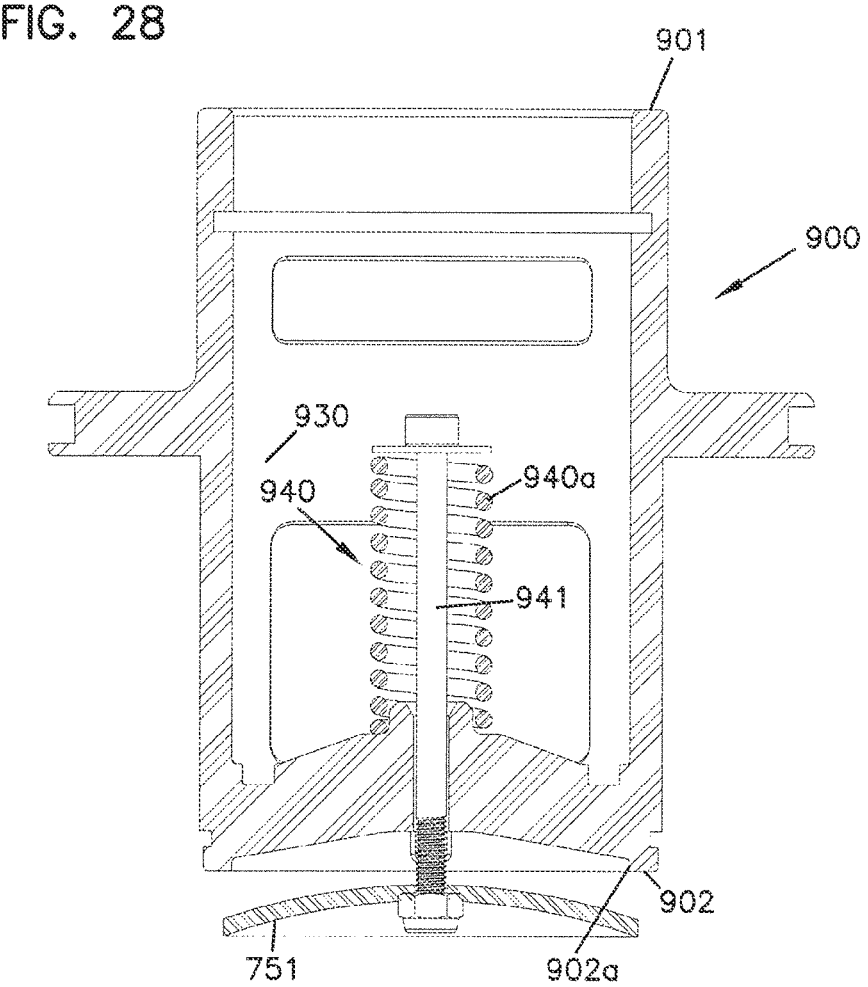
FIG. 28 is a view analogous to FIG. 27, showing the valve member in an open position.

In FIG. 27, frame piece 900 is depicted with member 751 mounted thereon. More specifically, at end 902, frame piece 900 includes aperture 902a. Valve member 751 is sized and positioned to seek and close aperture 902a. Valve member 751 is mounted on slideable post 941, and is secured thereto by nut 942. The post 941 and end 943 includes flange 944. Post 941 is secured under pressure by spring 940a between flange 944 and seat 945. The spring 940a is configured to allow the valve member 751 to move out of the seat closing aperture 902a, under a pressure within region 930 as desired or set, by the manufacturer. As with the arrangement of FIG. 1, a typical opening pressure would be on the order of 0.5 bar (0.3-0.7 bar). In FIG. 28, valve member 751 is shown biased open, to allow flow passage through aperture 902a.

Figure 25:
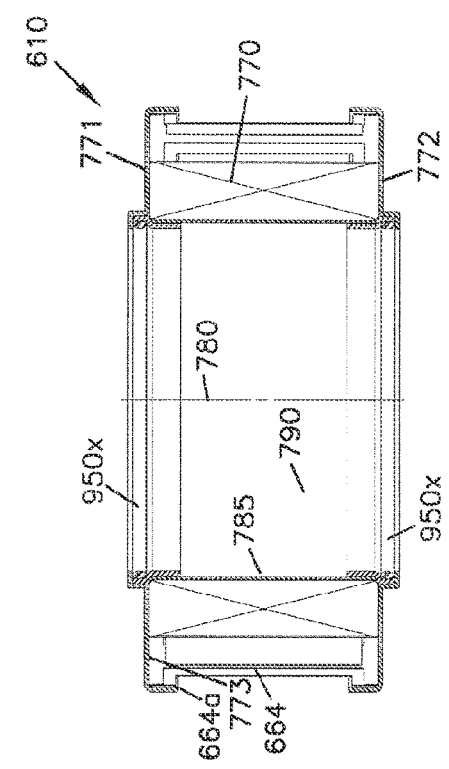
FIG. 25 is a cross-sectional view of the sub-assembly of FIG. 24.
Figure 24:
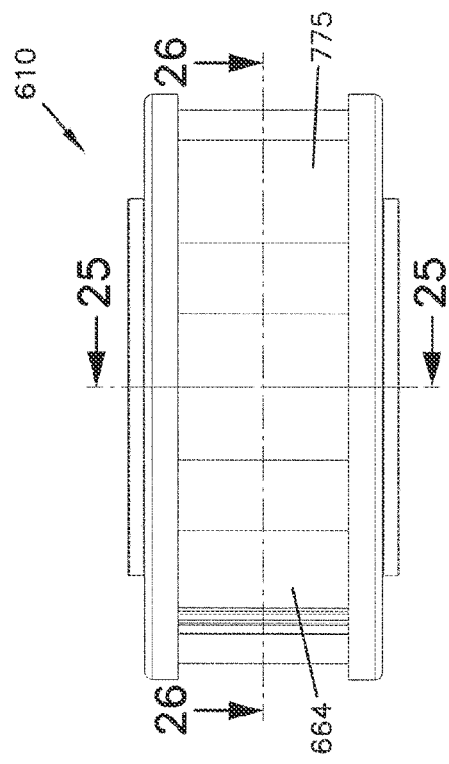
FIG. 24 is a side elevational view of a suction filter and non-helical spring, directionally biased valve arrangement, configured as a sub-assembly for useable in the arrangement of FIG. 10.

Attention is directed to FIGS. 24-26, in which a subassembly comprising the suction filter arrangement 610 is depicted. Suction filter arrangement 610 comprises media 770 extending between end caps 771, 772, FIG. 25. It can be seen, in FIG. 25, that around the outside of the media 770, is provided a space 773 between end caps 771, 772.

The suction filter arrangement 610 includes, positioned within space 773, directionally biased valve arrangement 664. The directionally biased valve arrangement 664 comprises a ring 775 having cat (flap) valves 776 thereon. The flap valves 776 are oriented to open by pivoting toward axis 780, FIG. 25, and away from opening 664a, FIG. 25.

Figure 29:
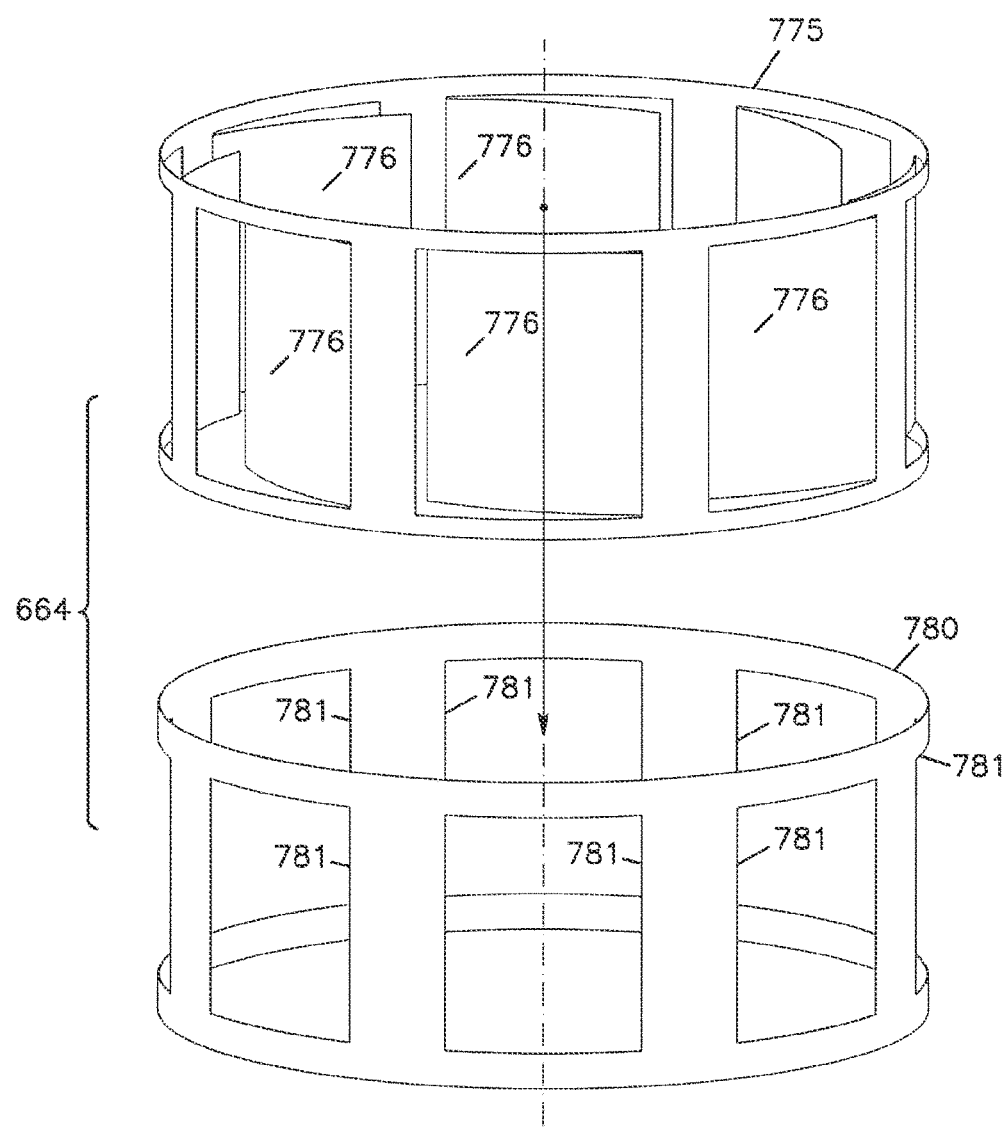
FIG. 29 is an exploded schematic view of a non-helical spring valve arrangement useable for the suction valve assembly described herein for FIGS. 10 and 11.

In FIG. 29, the directionally biased valve arrangement 664 is shown comprising ring 775, with flap valves 776 thereon. In FIG. 29, flap valves 776 are shown biased open. The directionally biased valve arrangement 664 also includes an outer support ring 780 including apertures 781. When assembled, the ring 775 will be positioned within the support ring 780, with the flaps 776 oriented aligned with aperture 781. To facilitate operation, ring 775 would typically comprise an annealed material.

It is noted that in FIG. 29, ring 775 is shown as a continuous circular piece. It can also be formed from a coiled strip, with an open gap or seam between opposite two ends, as shown for the embodiment of FIGS. 1-9.

The subassembly 654, FIGS. 24-26, is mounted within assembly 601, and on the housing 603 as shown in FIG. 12, with sealing by o-rings 950x against valve frame piece 900 and is held in place by ring 951. Of course, mounting of the valve frame piece 900 on side wall 607 was described above.

The media 770 would typically comprise a cylindrical wire mesh or plastic mesh media, typically pleated, supported by a porous inner liner 785. A variety of alternate media arrangements can be used for the media 770, including for example non-woven media of cellulose synthetic or glass fibers. The choice of media would typically be made for the particular environment of use. However for a typical environment involving hydraulic fluids, the intake filter assembly would typically use a wire mesh or plastic mesh screen.

The end caps 771, 772 can be metal, or they are molded from a polymeric material, such as a polyamide, typically a glass-filled (for example 15-30% glass filled, by wt.) polyamide. They can be conveniently secured to the media 770.

Referring to FIG. 12, in general should the pressure and region 633, or flow demands in that region, require in flow from the tank, flap valves 776 of ring 775 will pivot inwardly, allowing liquid flow to be drawn into suction filter 610, through media 770 and into central region 790 of the suction filter 610. The liquid can then be drawn up into region 633 and be directed outwardly through outlet arrangement 633, FIG. 10, 11, as appropriate.

Figure 13:
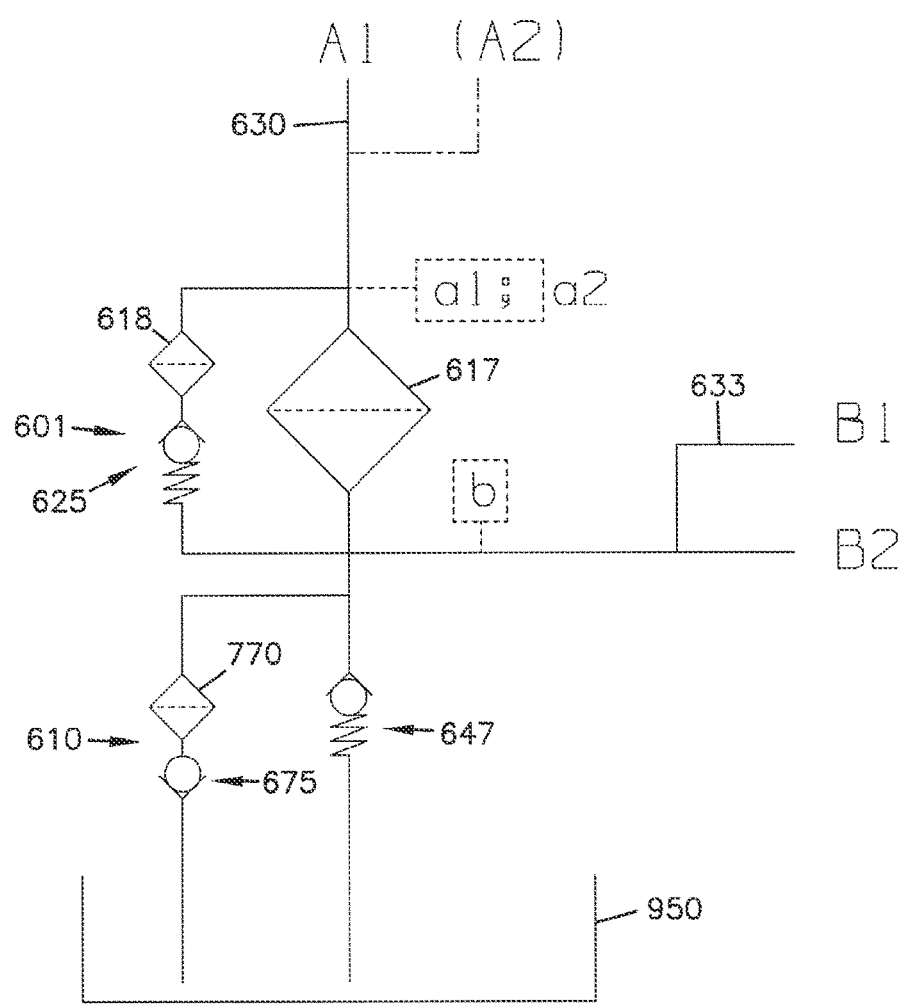
FIG. 13 is a flow chart depicting operation of the assembly of FIG. 10.

Attention is now directed to FIG. 13, which, analogously to FIG. 2, shows general operation of the assembly 601. Referring to FIG. 13, the inlet arrangement is shown at 630, comprising two inlet ports A1, A2 (inlet port A2 being optionally used or capped).

At 617, the main filter assembly is shown, with filtered liquid being circulated for outlet arrangement 633, comprising outlet lines B1, B2 (optionally one of lines B1 and B2 being capped). The bypass filter 618 is viewable, receiving liquid from inlet 630, if appropriate, controlled by bypass valve arrangement 625. Liquid which goes through bypass valve assembly 625 can be directed through outlet 633, as shown.

At 647, the flow regulation valve arrangement is shown, allowing for selected flow into tank 950. Draw from tank 950 is shown going through suction filter arrangement 610 comprising valve ring 675 and media 770.

The major differences between the flow chart of FIG. 13, and the flow chart of FIG. 2, are:

1. In the suction filter arrangement 610, FIG. 13, the valve arrangement 675 is positioned around the media 770. That is, the valve member 675 is positioned between the media 770 and the tank 950; and 2. The inlet arrangement 630 and outlet arrangement 633 are depicted with optional second lines.

The following dimensions will be useable in understanding how arrangements utilizing the principles of FIGS. 10-26, can be implemented for in-tank arrangements having flows therethrough of, for example, up to 250 liters per minute.

Total length of unit, FIG. 10, from top of cover handle to bottom lid: 370 mm, for about 200 liter/minute operation, 445 mm for about 250 liter/minute operation. Length of unit from bottom edge of filter head 604 to lower end of bypass filter: 316 mm for about 200 liter/minute operation, 382 mm for about 250 liter/minute operation.

The following dimensions are reasonable for an element for up to 200 liter/min. operation: Outside diameter suction filter—100 mm; outside diameter of tubular valve member for bypass valve—50 mm; total length of tubular bypass valve member—17 mm; inside diameter of tubular bypass valve member 42 mm; total length of service cartridge about 370 mm; outside diameter of third end cap with outwardly projecting lip 698, FIG. 12—97.2 mm; total axial length of valve frame piece 900, FIGS. 21-23—95.2 mm; inside diameter of aperture at end 901, FIG. 21—50 mm; outside diameter of seal support 905, FIG. 23—96 mm; total length of housing side wall 607—339 mm; outside diameter of suction filter, FIGS. 24-26—99 mm; total height of suction filter assembly 610, FIGS. 24 and 25—46.2 mm; total height of opening 664a, FIG. 25—29 mm. The dimensions can be varied. For optimization for specific selected systems, the above provide an example or guide, from which to work toward optimized dimensions.

Other dimensions can be calculated for scale, or be determined based on a specific application.

What is claimed:

1. A liquid filter cartridge comprising:
   (a) primary filter media surrounding a central volume and defining a central axis, and the cartridge having a seal mount positioned adjacent to the filter media configured to define a seal plane non-orthogonal to the central axis;
   (b) a first end cap positioned on a first end of the media;
      (i) the first end cap having a central aperture therethrough;
      (ii) the first end cap including a seal support thereon;
      (iii) the seal support projecting in a direction away from the primary filter media;
      (iv) a radially directed seal mounted on the seal support of the first end cap and configured to seal against a portion of a filter housing when liquid filter cartridge is installed in the filter housing for use;
   (c) a second end cap positioned at an opposite end of the media from the first end cap;
      (i) the second end cap having a central aperture therethrough;
      (ii) the seal support of the first end cap projecting in a direction away from the second end cap.

2. A liquid filter cartridge according to claim 1 including:
   (a) a bypass filter cartridge section positioned on the first end cap in extension away from the second end cap.

3. A liquid filter cartridge according to claim 1 wherein:
   (a) the seal mount is positioned on the second end cap.

4. A liquid filter cartridge according to claim 1 wherein:
   (a) the seal mount is configured to define a seal plane extending at an acute angle, with respect to the central axis, within the range of 30°-60°, inclusive.

5. A liquid filter cartridge according to claim 4 wherein:
   (a) the radial seal is configured to form an inwardly directed radial seal against a stand pipe surrounded by the radial seal, when the filter cartridge is installed in the filter housing.

6. A liquid filter cartridge according to claim 1 wherein:
   (a) the radial seal is configured to form an inwardly directed radial seal against a stand pipe surrounded by the radial seal, when the filter cartridge is installed in the filter housing.

7. A liquid filter assembly comprising:
   (a) a housing comprising a filter head and a housing sidewall;
      (i) the filter head comprising:
         (A) a filter head body;
         (B) a top cover removable from the filter head body to define a service opening in the filter head; and
         (C) a bottom aperture positioned opposite the operable top cover and service opening;
      (ii) the housing sidewall being positioned to extend through the bottom aperture in a direction opposite the top cover;
      (iii) the housing including a bottom end opposite the filter head, the housing including a tube on the bottom end;
   (b) a liquid filter cartridge comprising:
      (i) primary filter media surrounding a central volume and defining a central axis, and the cartridge having a seal mount positioned adjacent to the filter media configured to define a seal plane non-orthogonal to the central axis;
      (ii) a first end cap positioned on a first end of the media;
         (A) the first end cap having a central aperture therethrough;
         (B) the first end cap including a seal support thereon;
         (C) the seal support projecting in a direction away from the primary filter media;
         (D) a radially directed seal mounted on the seal support of the first end cap and configured to seal against a portion of the housing when liquid filter cartridge is installed in the housing for use;
      (iii) a second end cap positioned at an opposite end of the media from the first end cap;
         (A) the second end cap having a central aperture therethrough;
         (B) the seal support of the first end cap projecting in a direction away from the second end cap.

8. A liquid filter assembly according to claim 7 including:
   (a) a bypass filter cartridge section positioned on the first end cap in extension away from the second end cap.

9. A liquid filter assembly according to claim 7 including:
   (a) a suction filter assembly secured to the liquid filter assembly; the suction filter assembly including:
      (i) an extension of suction filter media defining a central volume; and,
      (ii) a first, non-helical spring, directionally biased valve arrangement comprising a ring shaped valve member having at least one cut valve therein positioned and configured to:
         (A) readily permit liquid flow from a tank reservoir through the suction filter media and into an interior of the housing; and,
         (B) to resist liquid flow from the housing interior, into a tank reservoir.

10. A liquid filter assembly according to claim 9 wherein:
    (a) the ring-shaped valve member has a plurality of flap valves therein and defines an internal volume.

11. A liquid filter assembly according to claim 7 wherein:
(a) the seal mount is positioned on the second end cap.

12. A liquid filter assembly according to claim 7 wherein:
(a) the seal mount is configured to define a seal plane extending at an acute angle, with respect to the central axis, within the range of 30°-60°, inclusive.

13. A liquid filter assembly according to claim 12 wherein:
(a) the radially directed seal is configured to form an inwardly directed radial seal against a tube surrounded by the radially directed seal, when the filter cartridge is installed in the housing.

14. A liquid filter assembly according to claim 12 including:
(a) a bypass valve arrangement positioned within the housing.

15. A liquid filter assembly according to claim 14 wherein:
(a) the bypass valve arrangement includes:
  (i) a slidably mounted tubular valve member slidable between an open orientation and a closed orientation.

16. A liquid filter assembly according to claim 7 wherein:
(a) the radially directed seal is configured to form an inwardly directed radial seal against a tube surrounded by the radially directed seal, when the filter cartridge is installed in the housing.

* * * * *